US011414717B2

United States Patent
Wang et al.

(10) Patent No.: US 11,414,717 B2
(45) Date of Patent: Aug. 16, 2022

(54) SURFACE HARDENING OF SUBSTRATES BY A PARTICLE-CONTAINING CAVITATING WATERJET

(71) Applicant: Northwestern University, Evanston, IL (US)

(72) Inventors: Qian Wang, Mount Prospect, IL (US); Yip-Wah Chung, Wilmette, IL (US); Kornel F. Ehmann, Evanston, IL (US); Xingliang He, Evanston, IL (US); Yi Shi, Evanston, IL (US); Zhong Liu, Evanston, IL (US)

(73) Assignee: Northwestern University, Evanston, IL (US)

( * ) Notice: Subject to any disclaimer, the term of this patent is extended or adjusted under 35 U.S.C. 154(b) by 339 days.

(21) Appl. No.: 16/495,536

(22) PCT Filed: Mar. 21, 2018

(86) PCT No.: PCT/US2018/023475
§ 371 (c)(1),
(2) Date: Sep. 19, 2019

(87) PCT Pub. No.: WO2018/175526
PCT Pub. Date: Sep. 27, 2018

(65) Prior Publication Data
US 2020/0087743 A1    Mar. 19, 2020

Related U.S. Application Data
(60) Provisional application No. 62/475,358, filed on Mar. 23, 2017.

(51) Int. Cl.
*C21D 1/00* (2006.01)
*C21D 1/06* (2006.01)
(Continued)

(52) U.S. Cl.
CPC ............ *C21D 1/06* (2013.01); *B05B 1/02* (2013.01); *B82Y 30/00* (2013.01); *C23C 24/04* (2013.01)

(58) Field of Classification Search
CPC ............ C21D 7/04; C21D 7/06; F04F 5/10
See application file for complete search history.

(56) References Cited

U.S. PATENT DOCUMENTS 5,778,713 A * 7/1998 Butler ............... B24C 1/003
                                                        451/39
6,135,857 A * 10/2000 Shaw ................ B24C 1/10
                                                        451/39
(Continued)

FOREIGN PATENT DOCUMENTS

WO    WO2005/056879    6/2005

OTHER PUBLICATIONS

Hutli et al., The ability of using the cavitation phenomenon as a tool to modify the surface characteristics in micro- and in nano-level, Tribology International 101 (2016) 88-97 (Year: 2016).*

(Continued)

*Primary Examiner* — Hoa (Holly) Le
(74) *Attorney, Agent, or Firm* — Bell & Manning, LLC

(57) ABSTRACT

In an embodiment, a method of hardening a surface of a substrate comprises directing a waterjet having a transition flow region, the waterjet comprising water and particles, at a surface of a substrate such that the waterjet impacts the surface within the transition flow region to provide a layer of embedded particles underneath the surface of the substrate, thereby forming a hardened substrate. The hardened substrates are also provided.

20 Claims, 15 Drawing Sheets

Treatment with nanoparticle-laden cavitating waterjet

(51) Int. Cl.
*B05B 1/02* (2006.01)
*B82Y 30/00* (2011.01)
*C23C 24/04* (2006.01)

(56) References Cited

U.S. PATENT DOCUMENTS

| 9,062,354 | B2 | 6/2015 | Mathai et al. | |
|---|---|---|---|---|
| 2011/0250361 | A1* | 10/2011 | Vijay | B24C 11/00 451/75 |
| 2013/0233040 | A1* | 9/2013 | Butler | C21D 7/06 72/56 |
| 2013/0263635 | A1* | 10/2013 | Barth | C21D 7/06 72/56 |
| 2017/0036239 | A1* | 2/2017 | Vijay | B05D 3/12 |
| 2017/0144270 | A1* | 5/2017 | Twomey | C23C 24/04 |

OTHER PUBLICATIONS

He et al., Surface hardening of metals at room temperature by nanoparticle-laden cavitating waterjets, J. of Mater. Processing Tech . 275 (2020) 116316.*

International Search Report and Written Opinion for PCT/US2018/023475, dated Jun. 11, 2018.

Srivastava et al., "Potential of using waterjet peening as a surface treatment process for welded joints," Procedia Engineering, vol. 149, pp. 472-480, Jan. 1, 2016.

Rajesh et al., "Water Jet Peening—A New Surface Treatment Process," International Conference on Shot Peening and Blast Cleaning, pp. 239-249, Jan. 1, 2016.

Boud et al., "The Impact of Plain Waterjet Machining on the Surface Integrity of Aluminium 7475," Procedia CIRP 13, pp. 382-386, 2014.

Arola et al., "Parametric Effects on Particle Deposition in Abrasive Waterjet Surface Treatments," Machining Science and Technology, vol. 8, No. 2, pp. 171-192, 2004.

Azhari, M., Effects of waterjet treatment on surface integrity of metals and its optimization. Dissertation, Technische Universitat Kaiserslautern, May 2014, 34 pages.

Tsai et al., An investigation into superficial embedment in mirror-like machining using abrasive jet polishing, Int J Adv Manuf Technology (2009) 43:500-512.

Mohd Azmir Mohd Azhari, "Effects of Waterjet Treatment on Surface Integrity of Metals and its Optimization," Dissertation, Technische Universitat Kaiserslautern, May 2014; pp. 1-179.

* cited by examiner

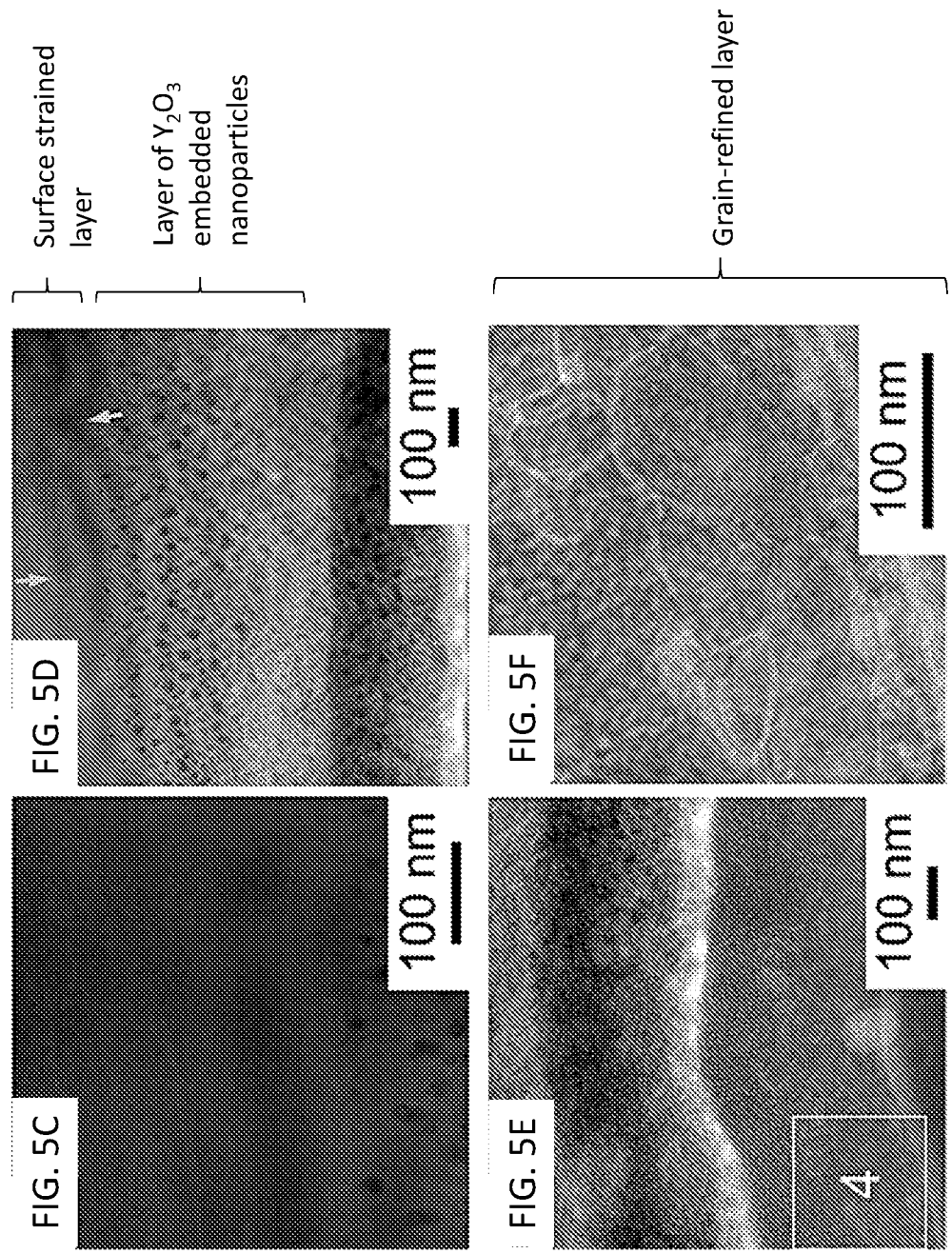

US 11,414,717 B2

SURFACE HARDENING OF SUBSTRATES BY A PARTICLE-CONTAINING CAVITATING WATERJET

CROSS REFERENCE TO RELATED APPLICATIONS

The present application is a National Stage of International Application No. PCT/US2018/023475, filed Mar. 21, 2018, which claims priority to U.S. provisional patent application No. 62/475,358 that was filed Mar. 23, 2017, the entire contents of each of which are hereby incorporated by reference.

BACKGROUND

Many engineering applications require hardening surfaces of components but not the bulk; e.g., gears, so that the desired surface properties can be achieved without sacrificing fracture toughness of the bulk material. Typical surface treatment technologies include: physical vapor deposition (e.g., sputtering),[1-5] thermal spray,[6-10] friction stir processing,[11-12] chemical vapor deposition,[13] boriding,[14-16] nitriding,[17-21] and carburizing.[21-23] With the exception of sputtering, all require temperatures from several hundred ° C. to over 1000° C. Processing times range from hours to days. Equipment costs range from $100k to $1 million. Regarding the processing temperature, the use of such high temperatures may cause adverse effects in the parts to be treated, e.g., part distortion, undesirable microstructural changes, and potential cracking due to thermal shock. The use of high temperatures may also result in reduced efficiency in energy utilization and manufacturing throughput.

SUMMARY

Provided are methods of modifying substrates using a particle-containing cavitating waterjet.

In one aspect, methods of hardening surfaces are provided. In an embodiment, a method of hardening a surface of a substrate comprises directing a waterjet having a transition flow region, the waterjet comprising water and particles, at a surface of a substrate such that the waterjet impacts the surface within the transition flow region to provide a layer of embedded particles underneath the surface of the substrate, thereby forming a hardened substrate.

In another aspect, hardened substrates are provided. In an embodiment, a hardened substrate having a surface comprises a layer of embedded particles underneath the surface of the substrate.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the present disclosure will hereafter be described with reference to the accompanying drawings, wherein like numerals denote like elements.

FIG. 4A shows energy dispersive X-ray spectroscopy (EDS) element mapping of a cross-section of the $Y_2O_3$ nanoparticles-embedded Al substrate for Al (grayness indicates the presence of Al). FIG. 4B shows EDS element mapping of the cross-section for Y (lightness indicates the presence of Y). FIG. 4C is a scanning electron microscope (SEM) image of the cross-section. FIG. 4D shows an EDS spectrum of the square area highlighted in the SEM image of FIG. 4D. FIG. 4E show the results of an EDS line scan taken along the line highlighted in the SEM image of FIG. 4C (top, Y and bottom, Al).

FIGS. 5A-5G show transmission electron microscope (TEM) images of treated Al alloy substrates. FIG. 5A shows a bright-field TEM image of the bulk of the Al alloy. FIG. 5B shows a dark-field TEM image of the $Y_2O_3$ nanoparticles-embedded Al alloy substrate. These two figures consist of several TEM images that were taken separately. FIGS. 5C, 5D, and 5E show a magnified bright-field TEM image from squared areas 1, 2, and 3 of FIG. 5B, respectively. A further magnified bright-field TEM image from squared area 4 of FIG. 5E is shown in FIG. 5F; the grains smaller than 100 nm can be easily seen. FIG. 5G shows a schematic of the transformation of an Al alloy substrate using a particle-containing waterjet according to an illustrative embodiment to provide the Al alloy substrate with a surface-hardened region composed of a surface-strained layer, a layer of embedded $Y_2O_3$ nanoparticles directly beneath the surface-strained layer, and a grain-refined layer directly beneath the layer of embedded $Y_2O_3$ nanoparticles.

FIG. 6B shows a detailed comparison of the Al (200) peak before and after embedment of the $Y_2O_3$ nanoparticles according to an illustrative embodiment; scanning of the $2\theta$ at a slow rate of $0.0008°\ s^{-1}$.

DETAILED DESCRIPTION

Provided are methods of modifying substrates using a particle-containing cavitating waterjet. The modified substrates are also provided. In embodiments, waterjets laden with micro- and nano-scale particles can be used to strengthen the surfaces of metallic alloys, providing a low temperature (e.g., 10° C. to 100° C., including room temperature) route for low-cost (e.g., less than $100k) and high-efficiency surface processing (e.g., 0.01 to 1 hour, including 10 minutes). Without the need to treat surfaces at elevated temperatures, at least some embodiments of the methods obviate problems of part distortion, undesirable microstructural changes, and potential cracking due to thermal shock.

Figure 1A:
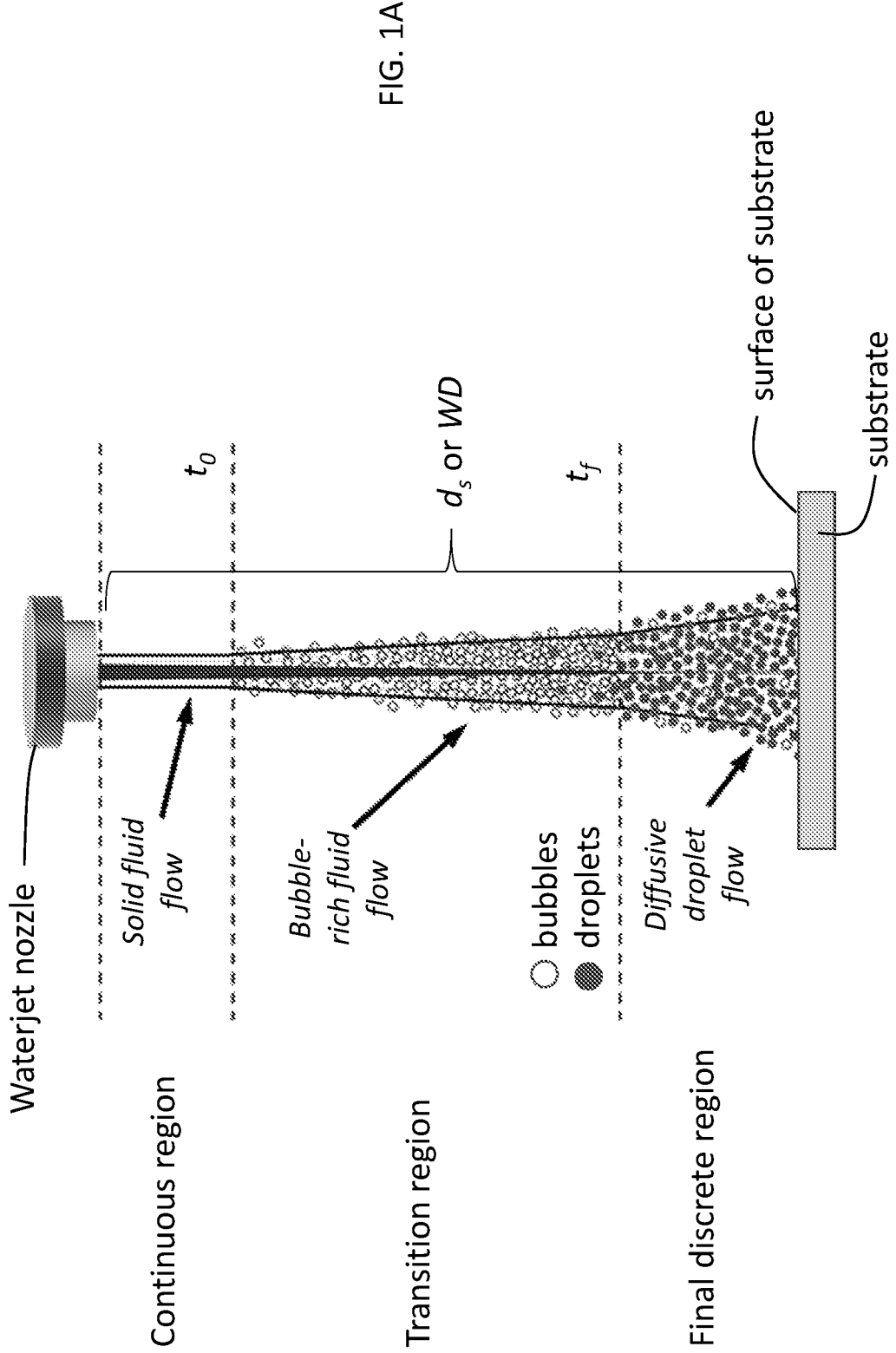
FIG. 1A is a schematic of a waterjet, showing three different regions of the waterjet.

Depending on the pressure and impact angle, a high-speed, high-pressure waterjet system has been used for machining or peening of materials,[24-25, 27-31] with or without abrasive substances. There is no heat-affected zone in the materials treated since the operation is performed at room temperature, and the materials are cooled by the water flow. The present disclosure makes use of a waterjet system as a room-temperature surface-processing tool by tuning the dynamics of the waterjet. As shown in FIG. 1A, a waterjet experiences three stages as the pressurized fluid exits from the nozzle:[34-36] a continuous region (solid-fluid flow), a transition region (bubble-rich fluid flow), and a final discrete region (diffusive droplet flow). Machining (cutting, milling, drilling, etc.) makes use of the solid-fluid flow, while cleaning and peening make use of the diffusive-droplet flow.[24-25, 27-31] Because cavitation is usually avoided in the design of conventional fluid machinery,[37-38] the potential power of the bubble-rich fluid flow operating in the transition region of waterjets has not been utilized.

However, as demonstrated in the Example, below, it has been found that the transition flow region may be used to achieve surface modification (e.g., of a workpiece) via the dynamic cavitation and collapse processes occurring in this region. The latter process induces a localized shock pressure. When the waterjet is laden with hard micro- and nano-scale particles, this shock pressure drives these particles towards the workpiece at high velocities, thus causing their embedment and hence marked increases in surface and subsurface hardness. Certain parameters of the waterjet may be controlled to achieve waterjet-assisted surface strengthening, thus enabling a high-efficiency and convenient technique for surface modification of metallic alloys and other materials for improved surface mechanical and tribological properties without resorting to high-temperature methods.

Applications for the present methods include providing hardened or reinforced surfaces, surface material patterning, multi-material patterning, repair of surface defects in pre-manufactured objects, etc.

Figures 4A, 4B, 4C:
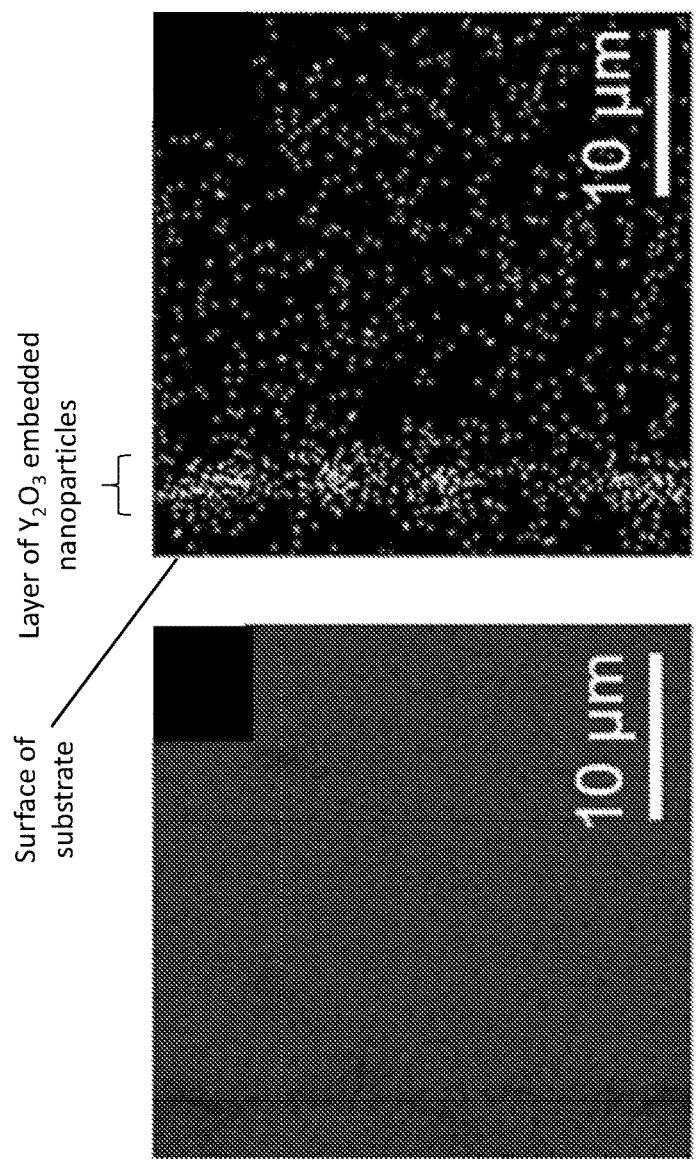
FIGS. 4A-4E show the results of elemental analysis experiments for an Al alloy substrate after treatment with a particle-containing ($Y_2O_3$ nanoparticles) waterjet according to an illustrative embodiment.

In one embodiment, a method of modifying a substrate comprises directing a waterjet having a transition flow region, the waterjet comprising water and particles, at a surface of a substrate such that the waterjet impacts the surface within the transition flow region to embed a plurality of the particles into the substrate. In the present disclosure, use of the transition flow region of the waterjet to impact the surface may be referred to as use of a "cavitating water jet" (see FIG. 1B). The plurality of particles may be formed as a sub-surface layer within the substrate, i.e., a layer of the embedded particles underneath the surface of the substrate. Such a layer is labeled in FIG. 4B, showing an energy dispersive X-ray spectrum (EDS) of a cross-section of a substrate (an aluminum alloy) which was treated with a $Y_2O_3$ nanoparticle-laden cavitating waterjet according to an illustrative embodiment. Such a layer is also labeled in FIGS. 5B and 5D, showing a magnified bright-field TEM image of a similar cross-section of a substrate similarly treated. These figures are described more detail in the Example, below. The term "layer" refers to a volume of substrate material through which the embedded particles are found. The layer may be identified as that volume of substrate material which contains the greatest density of embedded particles in the substrate. This means that some embedded particles may be above and below the layer, e.g., see FIG. 4B. As shown in FIGS. 4B and 5D, the layer may be generally planar and parallel to the surface of the substrate; however, this does not mean the layer need be perfectly planar/parallel. The existence of the layer may be confirmed via EDS spectra and TEM images as described in the Example, below. Within the layer, the embedded particles may be characterized as being uniformly distributed throughout the substrate material such that are spaced apart from one another by approximately the same distance. (See FIG. 5D.) However, as shown in FIG. 5D, smaller particles may be embedded closer to the substrate surface while larger particles may be embedded deeper within the substrate.

Figure 1B:
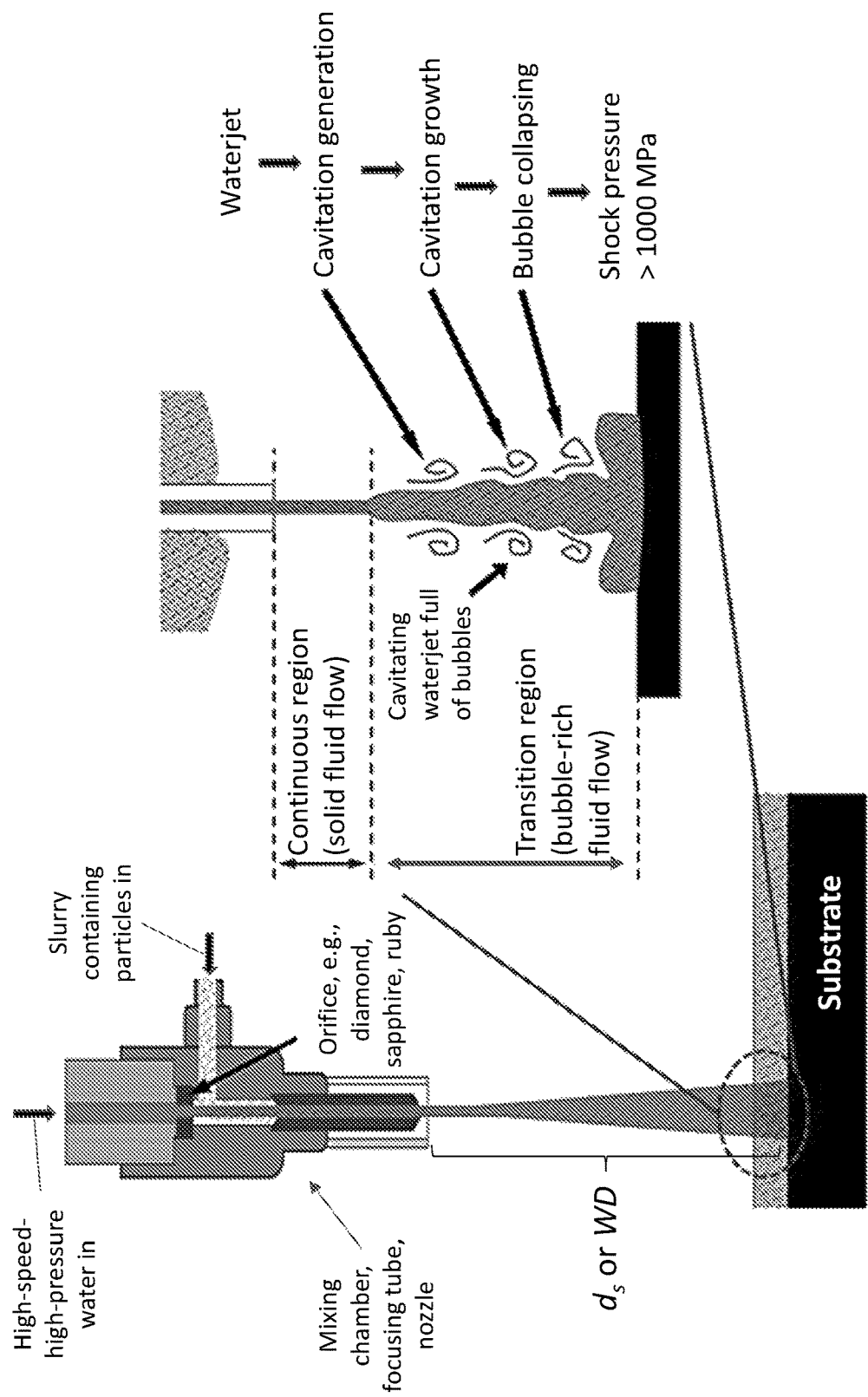
FIG. 1B is a schematic of a portion of a waterjet system illustrating use of a particle-containing cavitating waterjet to modify a substrate according to an illustrative embodiment.

By "waterjet" it is meant a jet of highly pressurized (e.g., 10 MPa or greater), high speed (e.g., as much as 2000 m/s) water such as the jet of water emerging from the narrow diameter (e.g., 0.01 mm to 10 mm) nozzle of a waterjet system. A portion of an illustrative waterjet system is shown in FIG. 1B. Other waterjet systems may be used, including the commercially available waterjet systems described in the Example, below. As noted above, "cavitating waterjet" is used to refer to use of the transition flow region portion of the waterjet.

As noted above, waterjets may be characterized by one or more flow regions. As shown in FIG. 1A, the illustrative waterjet is characterized by three flow regions, a continuous region closest to the nozzle (i.e., solid fluid flow), a final discrete region furthest from the nozzle (i.e., diffusive droplet flow), and a transition region between the continuous and final discrete regions (i.e., bubble-rich fluid flow). Cavitation, the formation of bubbles, occurs when the highly pressurized water is exposed to much lower, atmospheric pressure. The extent of cavitation, and thus, the density of bubbles in the liquid, is greatest in the transition flow region. The transition flow region may have relatively few or substantially no droplets of liquid. By contrast, the population of droplets is greatest in the final discrete region, where there may be relatively few or substantially no bubbles. The continuous region includes relatively few or substantially no bubbles or droplets of liquid.

Figure 2:
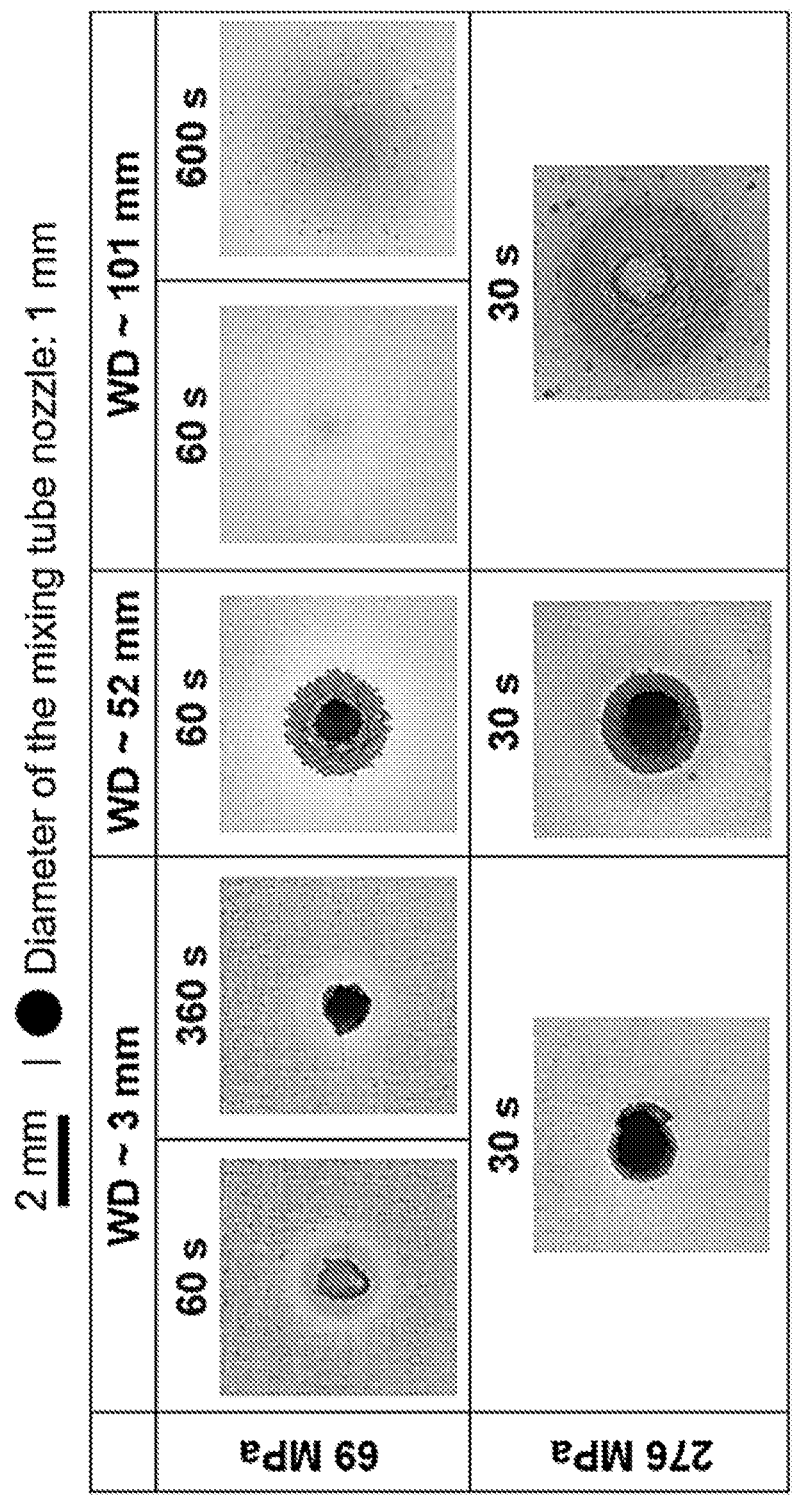
FIG. 2 shows optical microscope images of an Al alloy substrate after being treated with a particle-containing ($Y_2O_3$ nanoparticles) waterjet under different conditions.

The transition flow region may be characterized by a length extending from an initial point or boundary in the waterjet (e.g., the region where bubble formation is initiated) to a termination point or boundary in the waterjet (e.g., the region where droplet formation is initiated or where the density of droplets is greater than the density of bubbles). In FIG. 1A, these two boundaries are labeled $t_0$ and $t_f$, respectively. The waterjet may be made to impact a surface within any of the regions of the waterjet by adjusting the distance between the surface and the nozzle aperture. As illustrated in FIG. 1A, this distance is referred to as the stand-off distance, $d_s$ (or working distance, WD, as referenced in the Example, below). For purposes of illustration, FIG. 1A shows a configuration in which $d_s$ is selected such that the waterjet impacts the surface of the substrate within the final discrete region. However, in the present methods, the stand-off distance $d_s$ is selected such that the waterjet impacts the surface within the transition flow region of the waterjet, i.e., within the region between $t_0$ and $t_f$ (including at $t_0$ or $t_f$). (See FIG. 1B.) The specific value of $d_s$ and specific position between $t_0$ and $t_f$ to achieve impact within the transition flow region depends upon the dynamics of the waterjet (e.g., water pressure, nozzle geometry). For example, use of a greater water pressure can mean that a larger $d_s$ (WD) value has to be used to be within the transition flow region. This effect is illustrated in FIG. 2 and described in greater detail in the Example, below.

The waterjet comprises water and particles. A variety of particles may be used, depending upon the desired properties for the modified substrate. The particles may be characterized by their size. Illustrative particles include nanoparticles and microparticles. Nanoparticles may have at least one dimension (e.g., two, three) of about 1000 nm or less, e.g., 100 nm or less. Microparticles may have at least one dimension (e.g., two, three) in the range of about 500 nm to about 1 μm or about 1 μm to about 100 μm. The particles may have various shapes, e.g., spherical. The particles may be characterized by their composition. Illustrative compositions include metals, ceramics, polymers, metal alloys, metal oxides, metal borides, metal nitrides, metal carbides, metal phosphides, metal sulfides, metal arsenides, metal selenides, or combinations of such particles. The metal component of such compositions may be a transition metal. Illustrative particles include those composed of yttrium oxide, aluminum oxide (hardness≈25 GPa, density≈4 gm/cm$^3$), zirconium diboride (hardness≈30 GPa, density≈6 gm/cm$^3$), and tungsten tetraboride (hardness≈40 GPa, density≈10 gm/cm$^3$). For these materials, fine powders with diameters between 1 nm and 500 nm (e.g., between 10 nm and 100 nm) are commercially available or may be prepared using known methods.

Particles may have unmodified or modified (e.g., with surfactants) surfaces. The density of the particles in the waterjet may be adjusted depending upon the desired properties for the modified substrate. Illustrative densities include those in the range of from about 1 gm/cm$^3$ to about 100 gm/cm$^3$ or from about 1 gm/cm$^3$ to about 50 gm/cm$^3$. The particles in the waterjet may have about the same composition, morphology, size, etc. Alternatively, different types of particles having different characteristics may be included in the waterjet.

The particles may be provided to the waterjet in the form of a slurry comprising water and the particles. The slurry may be mixed with pressurized water in a mixing chamber of a waterjet system as illustrated in FIG. 1B. The slurry may include various amounts of particles (e.g., various weight %) in order to achieve the desired particle density in the waterjet.

The waterjet may further comprise additives, depending upon the desired properties for the modified substrate. By way of illustration, surface tension modifiers may be included in the waterjet in various amounts. Illustrative surface tension modifiers include, but are not limited to, anionic sodium dodecyl sulfate (SDS) and cationic cetyltrimethylammonium bromide (CTAB). Surface tension along a liquid-air interface arises from cohesive forces between liquid molecules. Bubbles form by balancing the cohesive forces and pressure difference across the bubble. The waterjet may include quantities of any of the surface tension modifiers described above sufficient to lower the surface tension of the water without affecting the viscosity of the bulk fluid.

A variety of substrates may be used in the present methods. Illustrative materials from which the substrate is composed include metals and alloys thereof (e.g., various types of aluminum alloys and steel). An illustrative aluminum alloy is 6061 aluminum alloy and an illustrative type of steel is 8620 gear steel. Other illustrative materials include polymers. Substrates composed of composite materials may also be used. The substrate may be a piece of raw material (from which some other object or device component is to be manufactured) or it may be a pre-manufactured object or device component (e.g., a tool, a gear, etc.).

Figure 3A:
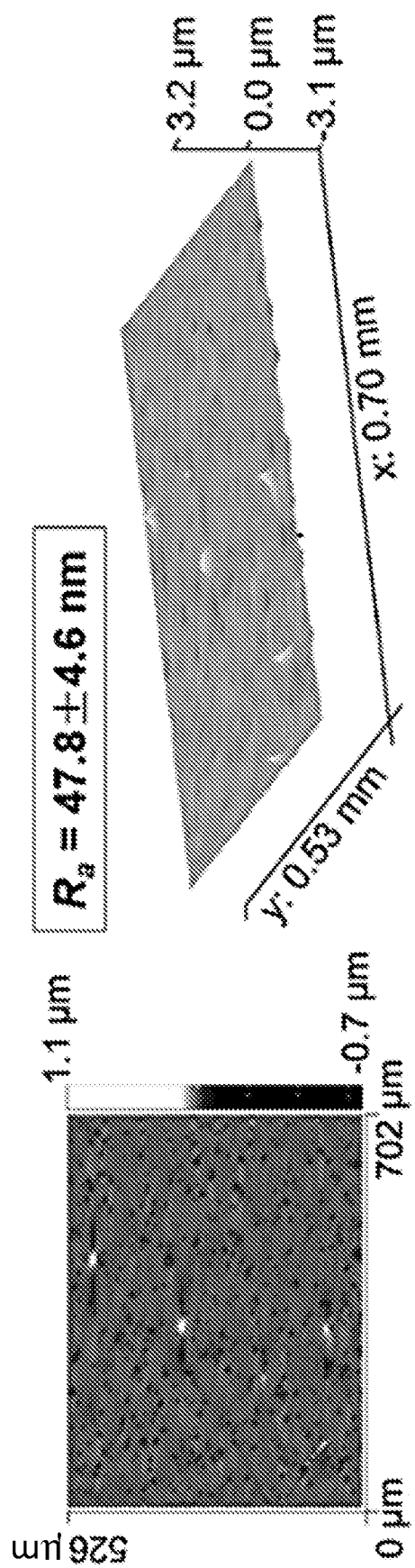
FIGS. 3A-3B show white light interferometry measurement results of Al alloy substrates before (FIG. 3A) and after (FIG. 3B) the embedment of $Y_2O_3$ nanoparticles. (Water pump pressure, working distance (WD), i.e., stand-off distance, $d_s$, and jet duration, were set at 69 MPa, 101 mm, and 600 s, respectively).
Figure 3B:
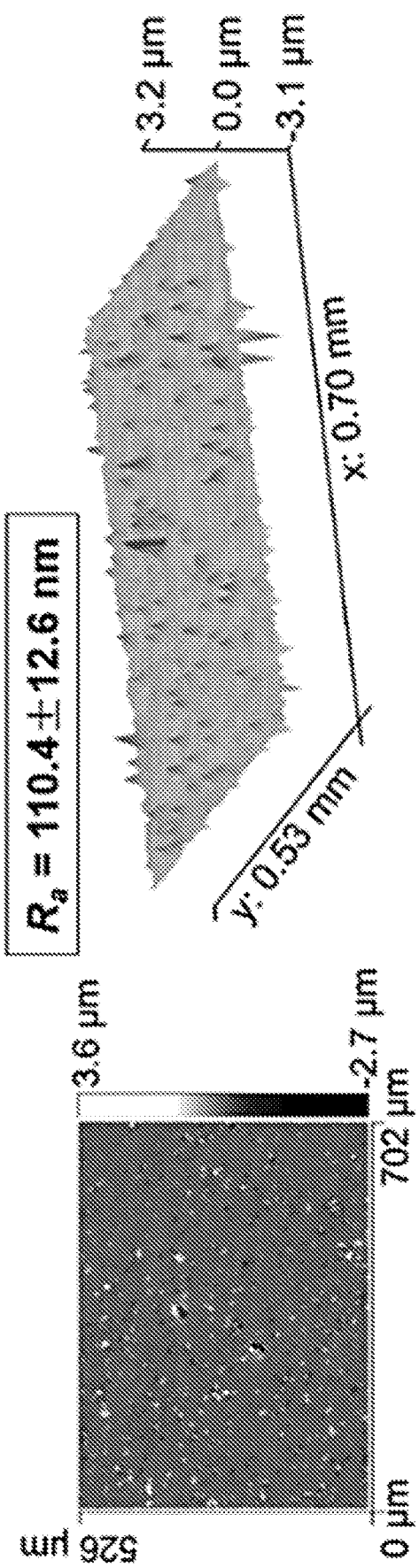

The conditions under which the waterjet is directed at the surface of the substrate may be adjusted, depending upon the desired properties for the modified substrate. Besides the stand-off distance, $d_s$, as described above, these conditions include one or more of the following: temperature, water pressure, time, waterjet angle. As described above, conditions such as $d_s$ and water pressure are selected to ensure that the waterjet impacts the surface of the substrate within the transition flow region. These conditions, as well as the others noted above, may also be selected to minimize damage to the substrate surface by the waterjet during processing, e.g., to prevent the formation of pits, holes, cuts, etc. in the substrate surface and/or to minimize surface roughness. Minimizing surface roughness can mean ensuring that the $R_a$ value of a treated substrate is close to the $R_a$ value of the substrate prior to treatment, e.g., the $R_a$ value of the treated substrate is no more than about 5 times greater, no more than about 2 times greater, or no more than about 1.5 times greater than that of the substrate prior to treatment. Surface roughness may be quantified by an average roughness $R_a$ value, which may be measured using the technique described in the Example below. (See also, FIGS. 3A-3B.)

Regarding illustrative values for the conditions described above, in embodiments, the method is carried out at about room temperature (i.e., from about 20° C. to 25° C.). In embodiments, the water pressure is in the range from about 10 MPa to about 500 MPa, from about 10 MPa to about 400 MPa, from about 60 MPa to about 130 MPa, or from about 70 MPa to about 130 MPa. The time refers to the length of time the surface (or a particular region of the surface) is exposed to the waterjet. Illustrative times include those in the range of from about 10 seconds to about 30 minutes or from about 30 seconds to about 600 seconds. Waterjet angle refers to the angle formed between the longitudinal axis of the waterjet and the plane defined by the surface of the substrate. As shown in FIGS. 1A-1B, in the illustrative configuration, the waterjet angle is 90°.

The present methods may be used to modify the entire surface of a substrate. In other embodiments, specific regions of the surface may be modified while other regions are left unmodified. This may be achieved by moving the waterjet and surface relative to each other. The conditions under which the waterjet is directed to different regions of the surface may be the same or different. In this way, a surface may be uniformly or nonuniformly modified; the surface may be modified along straight or curved paths; the surface may be modified randomly or in a pre-determined pattern; etc.

Figure 4D:
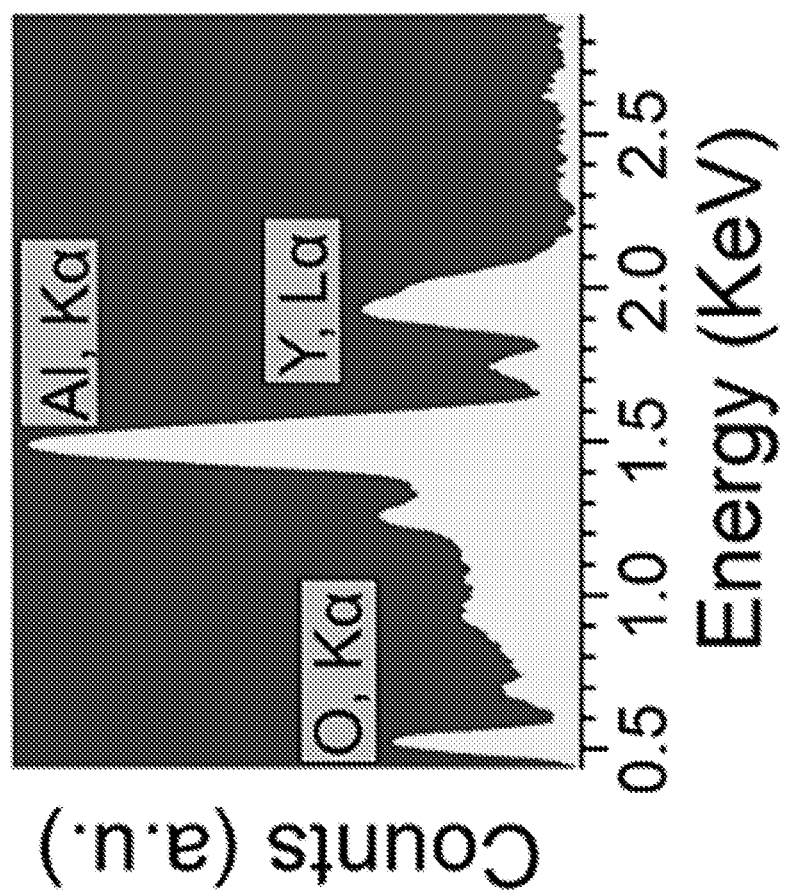
Figure 4E:
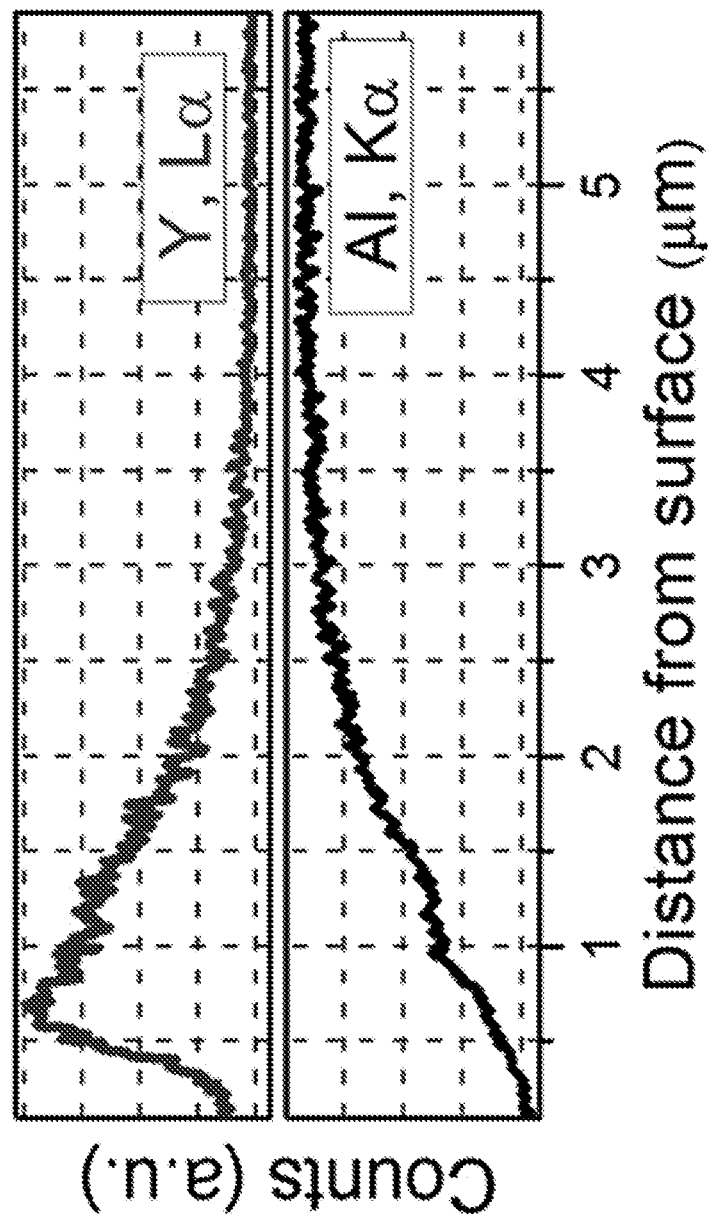

As noted above, the present methods provide substrates having particles embedded therein, including a layer of embedded particles. The term "embedded" refers to particles which are in direct contact with the material of the substrate and completely surrounded by the substrate material. However, the some of the particles from the particle-containing waterjet may end up being partially embedded, i.e., in direct contact with the material of the substrate by not completely surrounded by substrate material. Confirmation that particles have been embedded (and the extent of embedment) may be achieved via energy-dispersive X-ray line scans (see FIG. 4E), X-ray diffraction (XRD) spectra (see FIG. 6A) and TEM images (see FIG. 5D) as described in the Example, below. Atom probe tomography measurements may also be used to measure the composition profile from cross-sections of the modified substrate.

The present methods can also provide substrates having a surface-hardened region extending from the surface downward towards the bulk of the substrate. The surface-hardened region may comprise the layer of embedded particles described above, a surface-strained layer over the layer of embedded particles and a grain-refined layer under the layer of embedded particles. Each of these three layers may be in direct contact with one another. The surface-hardened region may further comprise an extended strained layer under the grain-refined layer, which may be in direct contact with the grain-refined layer. A surface-hardened region is shown schematically in FIG. 5G and verified experimentally in FIGS. 5B-F, 6A-6B and 7A for an aluminum alloy substrate treated with a $Y_2O_3$ nanoparticle-laden cavitating waterjet (as further described in the Example, below). The surface-strained layer is characterized by a compressed lattice spacing, which may be verified from TEM images (FIGS. 5B, 5D) and XRD spectra (FIGS. 6A-6B). The grain-refined layer is characterized by crystal grains having a reduced size as compared to crystal grains within the bulk of the substrate (or within an untreated substrate). The crystal grains of the grain-refined layer may also exhibit reorientation. The existence of the grain-refined layer may also be verified from the TEM images and XRD spectra described above. The existence of the extended strained layer may be verified using nanoindentation profiling such as that shown in FIG. 7A and described in the Example, below. The extended strained layer is characterized by a hardness which is greater than the hardness of the bulk of the substrate (see FIG. 7A). The term "layer" in surface-strained layer, grain-refined layer, and extended strained layer has a meaning analogous to that described above with respect to the layer of embedded particles. That is, it is used in reference to a volume of substrate material which exhibits the compressed lattice spacing, reduction in grain size, increased hardness, respectively, as described above. It is also to be understood that the boundaries of each of the layers are not and need not be perfectly distinct, e.g., some embedded particles may be found within the grain-refined layer. However, the existence of each layer may be definitively identified using the techniques referenced in this paragraph.

Modified substrates having particles embedded therein may be characterized by various properties. Such properties include depth of incorporation and hardness profile (including surface hardness). The value of each property depends upon the material of the substrate as well as the material(s) of the particles. However, the conditions under which the waterjet is directed at the surface of the substrate may also be adjusted as described above to achieve desired specific values. Depth of incorporation refers to the distance over which most (e.g., at least 70%, at least 80%, at least 90%) of the embedded particles are found in the substrate. This distance is measured from the surface of the substrate downwards along an axis normal to the surface of the substrate. The depth of incorporation may be used to identify the approximate bottom of the layer of embedded particles. In embodiments, the depth of incorporation is at least about 0.5 µm, at least about 2 µm, at least about 3 µm, at least about 5 µm, at least about 10 µm or in the range of from about 0.5 µm to about 10 µm or from about 2 µm to about 5 µm. The depth of incorporation may be measured from EDS line scans as described in the Example, below. (See FIG. 4E.) The density of embedded particles as measured from the surface to the value of the depth of incorporation may be in the range of from about 1 to 50 particles per 0.01 µm$^2$. This includes embodiments in which the density is in the range of from about 10 to 50 particles per 0.01 µm$^2$ or from about 20 to 50 particles per 0.01 µm$^2$.

A hardness profile measures the hardness of a substrate as a function of the distance from the surface, including the hardness at the surface of the substrate. A hardness profile also provides the hardening depth, the distance over which the hardness differs from the hardness of the bulk material of the substrate. The hardening depth may be used to indicate the approximate bottom of the extended strained layer. As described in the Example, below, the hardening depth may be greater than the actual depth of incorporation, e.g., at least about 5 times greater or at least about 10 times greater. The present methods may be used to increase the surface hardness of a substrate. In embodiments, the surface hardness may be increased by a factor of 1.2, about 2, about 5, about 10, etc. as compared to the surface hardness of the substrate prior to treatment with the present method. Hardness profiles, including surface hardness, may be measured using nanoindentation profiling as described in the Example, below. (See FIG. 7A).

Modified substrates may also be characterized by a coefficient of friction. The present methods may be used to decrease the coefficient of friction of a substrate. In embodiments, the coefficient of friction may be decreased by a factor of at least about 2 as compared to the coefficient of friction of the substrate prior to treatment with the present method. This includes embodiments in which the coefficient of friction is decreased by a factor of at least about 3, at least about 5, or in the range of from about 2 to about 5. Coefficients of friction may be measured using microscale scratching tests as described in the Example, below. (See FIGS. 8A-8B.)

EXAMPLE

Introduction

This Examples presents a novel and facile room-temperature surface-strengthening technique, capable of increasing the hardness of an aluminum alloy by 5 times, by utilizing the power of a cavitating waterjet. Microstructural and composition characterizations clearly reveal several mechanisms responsible for surface hardening: 1) cavitating waterjet-assisted dispersion strengthening; 2) grain reorientation (texture strengthening); 3) strain hardening; and 4) grain refinement (grain-boundary strengthening). The hardened metallic surface also creates a tribological wonder by reducing friction ~50% as demonstrated in a set of microscale scratching tests. Without the need of treating or re-melting the metallic surface at an elevated temperature, this original technique obviates such problems as huge energy usage, part distortion, microstructural and composition changes, and thermal shock-induced cracking. Equally important, the new method can be used to process and/or fabricate metals, polymers, composites, etc. with different properties.

Experimental

Materials. $Y_2O_3$ nanoparticles have been used as dispersion strengthening agents in alloys for heat exchanger tubing or high temperature turbine blades [42, 43]. $Y_2O_3$ nanoparticles (ø 30-45 nm, 99.99%; US Research Nanomaterials, Inc.) were chosen to be embedded into a soft metallic substrate, 6061-T6511 Al alloy bar (McMaster-Carr Supply Company), with the following chemical composition: chromium, ~0.4-0.8 wt. %; copper, 0.05-0.4 wt. %; iron, ~0-0.7 wt. %; magnesium, ~0.8-1.2 wt. %; manganese, ~0-0.15 wt.

%; nickel, ~0-0.05 wt. %; silicon, ~0.4-0.8 wt. %; titanium, ~0-0.15 wt. %; zinc, ~0-0.25 wt. %; zirconium, ~0-0.25 wt. %; and balance aluminum.

Waterjet-assisted embedding experiment. A Flow Mach 2b Waterjet cutting machine was used for performing the embedding experiments of the $Y_2O_3$ nanoparticles into the Al surface at room temperature. A DURAFLOW® diamond orifice assembly (ø 0.3 mm) was used in conjunction with a 76.2 mm-long ECL PREMIUM mixing tube assembly (ø 1 mm). A slurry containing ~5 wt % $Y_2O_3$ nanoparticles in deionized water was kept circulating using a Cole-Parmer Polystat Bath at 25° C. The slurry was fed to the mixing chamber via the Venturi effect, mixed with the high-speed-high-pressure water flow, and then ejected from the nozzle. The water pump pressure was set to 69 or 276 MPa. The jet duration and the working distance (WD) (i.e., stand-off distance, $d_s$) of the nozzle away from the workpiece were maintained from ~30 s to ~600 s and from ~3 mm to ~101 mm, respectively. 101 mm was the highest WD that could be set on the machine at hand.

Structural and composition characterization. Surface morphologies were inspected before and after the cavitating waterjet treatments using a ZYGO NewView™ 7300 white light interferometer. The corresponding microstructures were characterized using a Rigaku ATXG grazing incidence X-ray diffractometer (XRD) with a Cu Kα radiation (λ=1.5418 Å) operating at 40 kV and 50 mA. 2θ ranges from 20° to 80° and 44.2° to 45.4° were scanned at rates of 0.4° $s^{-1}$ and 0.0008° $s^{-1}$, respectively. Samples were then imaged by a Nikon ECLIPSE MA200 optical microscope, a JEOL 2100 transmission electron microscope (TEM)/Scanning TEM, and a Hitachi SU8030 field emission-scanning electron microscope (FE-SEM). The TEM samples were fabricated on a FEI Helios 650 Nanolab Focus Ion Beam (FIB) instrument. Specimens for the SEM imaging and energy dispersive X-ray spectra (EDS) analysis were mechanically cut first, while the cross sections were successively polished using different sand papers with micro-grit designations of P240, P800, P1200, and 2400. The final polish was with diamond suspension and a polishing cloth. The EDS spectra were recorded using an Oxford AZtec X-max 80 SDD detector connected to the SEM.

Mechanical and tribological tests. Nano-indentation profiling across the $Y_2O_3$ nanoparticle-embedded Al surface was conducted on the cross-section SEM samples using a Hysitron TI 950 TriboIndenter system, where a Berkovoich indenter was used under a 500 μN external load. Tribological properties of the Al substrates, before and after the waterjet-assisted embedment process, were evaluated by conducting microscale scratching tests on a Micro Materials NanoTest system under five different loads, 5 mN, 10 mN, 20 mN, 40 mN, and 60 mN. At room temperature, the scratching tests were conducted with a spherical steel tip (ø 2 mm) slid on the Al specimen surfaces at 1 μm/s for 300 μm. The lateral and normal forces were simultaneously recorded to calculate the coefficients of friction.

Results and Discussion

Cavitating Waterjet-Assisted Embedment of $Y_2O_3$ Nanoparticles at Room Temperature Unlike the traditional use of waterjets in cutting [29-31] and peening [24-28], the room-temperature surface hardening technique described in this Example involves control of the cavitating waterjet in the transition region to achieve an efficient embedding process without visibly damaging the metallic substrate. The working distance (WD) and water pump pressure were, hence, regulated in to obtain a bubble-rich high-speed high-pressure water flow to achieve the best embedment performance.

FIG. 2 briefly summarizes the experiments performed at three different WDs. At a low water pump pressure (69 MPa), a solid-fluid flow, co-existence of a solid-fluid/bubble-rich flow and a bubble-rich flow (transition region) are obtained respectively at WD of ~3 mm, ~52 mm, and ~101 mm. When the water pressure is high (276 MPa), a solid-fluid flow still exists at WD of ~3 mm, while the WD range for the co-existence of the solid-fluid/bubble-rich flow is extended from ~52 mm to ~101 mm. During the experiment, a significant amount of mist and tiny bubbles were generated while the waterjet was operating in the transition (cavitation) region, which could not be seen when the waterjet was operated in the solid-fluid flow region. As long as there is a solid-fluid flow in the waterjet, severe damage would quickly occur on the soft Al substrate. Damage, in the form of holes shown in FIG. 2, was created by mechanical actions of the solid-fluid flow, such as erosion, abrasion, impacting, wedging, grinding, machining, expanding, etc. [29-35]. Photos shown in the two rightmost columns of the second row of FIG. 2 indicate that bubble-rich water flow (transition region) is critical for effective embedment of $Y_2O_3$ nanoparticles into the Al surface without any obvious damage to the substrate surface.

Among all of the waterjet experimental conditions tested in the present Example, the combination of a 101 mm WD, 69 MPa water pump pressure, and 600 s jet duration resulted in the best treatment appearance without any obvious damages, even though the surface becomes rougher after the treatment. The surface roughening process can also be seen on the white light interferometry images, shown in FIGS. 3A-3B.

When the WD is at its highest setting, the cross section of the waterjet near the workpiece considerably expands, as compared to that in the solid-fluid flow in the continuous region (see the solid dot at the top of FIG. 2). The original shiny Al surfaces before waterjet treatment became whitish or grayish after the treatment. This circular area of impact could be easily seen by naked eye and was measured with a caliper. The thin, focused waterjet of 0.78 $mm^2$ cross-section successfully resulted in a well-spread impact area on the metallic substrate (>200 $mm^2$) within 10 minutes at room temperature, implying a high processing efficiency of the cavitating waterjet. Structural and composition characterizations of this specific sample along with further mechanical and tribological evaluations follow, below.

Characterization of the $Y_2O_3$ Nanoparticles-Embedded Al

Characterization results shown in FIGS. 4A-E, 5A-5F, and 6A-6B prove the new processing concept of using collapsing water bubbles in the transition-region of the waterjet to embed $Y_2O_3$ NPs (ø 30 nm-45 nm) into the 6061 Al alloy surface. Elemental analysis results were obtained (FIGS. 4A, 4B). These results reveal successful embedment of $Y_2O_3$ nanoparticles into the metallic substrate. The results also show that the distribution of the yttrium element is concentrated near the surface of the Al samples. A corresponding EDS spectrum (FIG. 4D) also indicates a substantial elemental ratio of yttrium in the surface. Elemental profiling shown in FIG. 4E demonstrates that the $Y_2O_3$ nanoparticles are well incorporated within the top two microns of the Al alloy surface.

The microstructures of the Al alloy surfaces before and after the waterjet-assisted embedment process were further characterized using TEM. Either bright-field or dark-field TEM images, shown in FIGS. 5A-5F, were selected for the different samples to exhibit the best resolution and/or contrast. The pre-tempered 6061-T6511 alloy used in this Example is a precipitation-hardened Al alloy. The boundaries of the large grains of the bulk Al structure are labeled in FIG. 5A ("Grain Boundaries"). Precipitate particles of $Mg_2Si$, $Fe_3SiAl_{12}$, $Fe_2Si_2Al_9$, $Mn_3SiAl_{12}$, and $Cr_3SiAl_{12}$, formed in the Al bulk during a solid-solution and/or an aging process [44-46], are also labeled in FIGS. 5A and 5B ("Precipitates"). Turning to FIG. 5B, observation of these precipitate particles also helps in identifying how deep the $Y_2O_3$ nanoparticles are embedded into the Al substrate. A depth of 2 μm from the surface of the Al substrate toward the Al bulk is marked with a double arrow and a dotted line in FIG. 5B. Notably, the precipitate particles are not visible within this region (i.e., within the 2 μm layer from the surface of the Al substrate). The thickness of this region is in accordance with the EDS element analysis results discussed in FIG. 4E. As indicated by a series of small arrows in FIGS. 5B and 5D, strains have accumulated in the outmost areas (i.e., areas closest to the surface of the Al substrate) of the treated Al surface. The formation of this surface-strained layer may be caused by the mechanical impact of the $Y_2O_3$ nanoparticles.

Figure 5A:
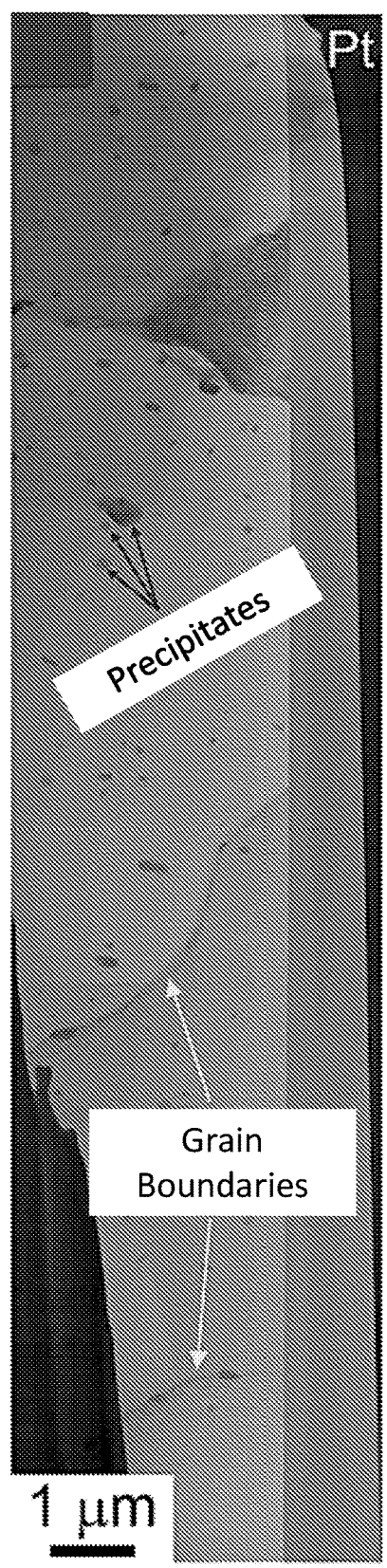
Figure 5B:
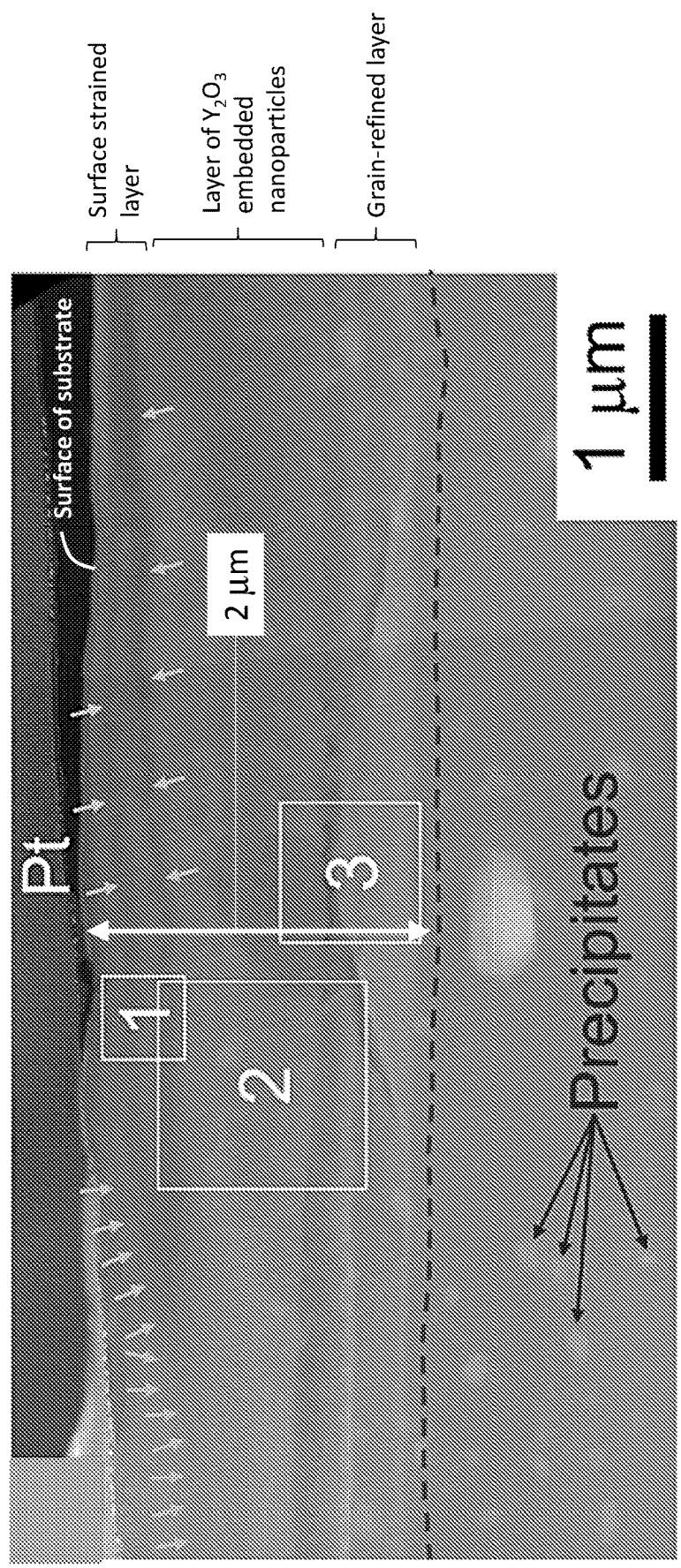
Figure 5G:
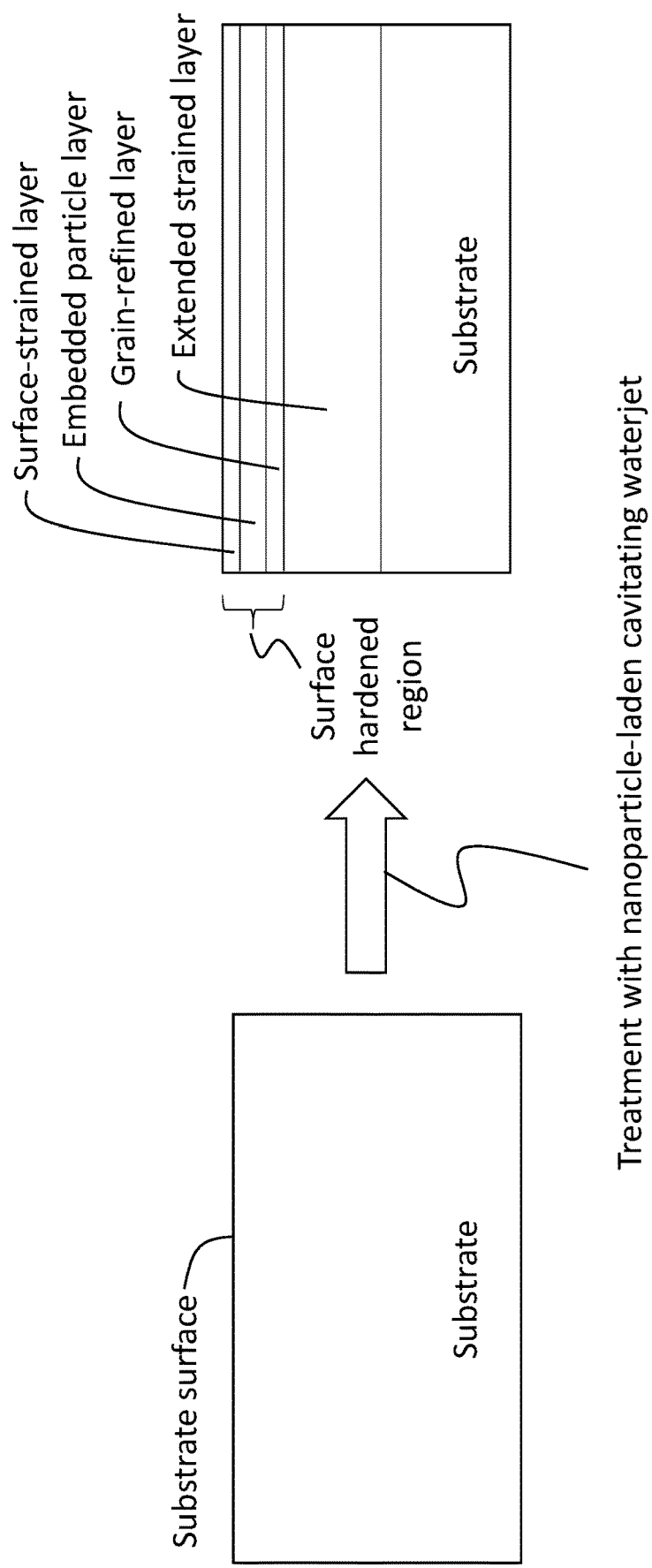
Figure 6B:
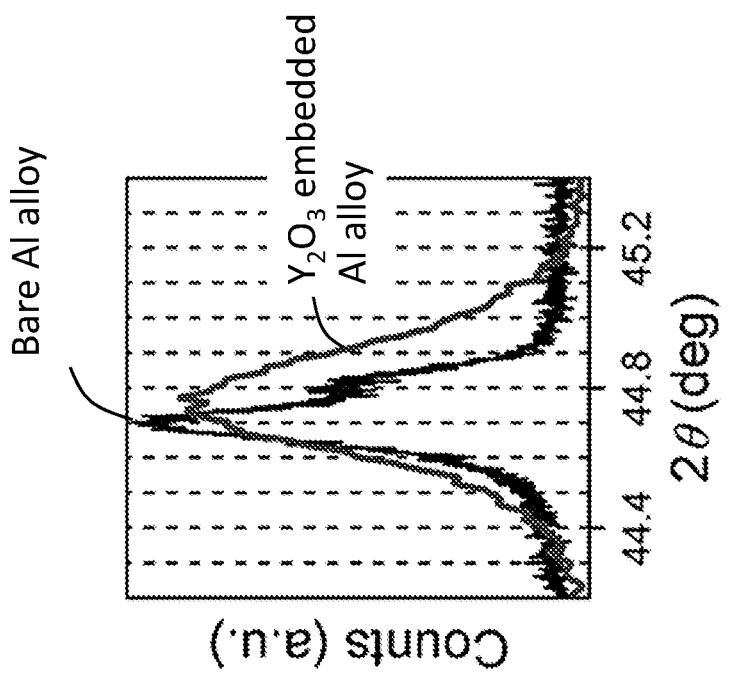
FIGS. 6A-6B show XRD patterns of Al alloy substrates before (bottom) and after (top) the embedment of $Y_2O_3$ nanoparticles according to an illustrative embodiment.
Figure 6A:
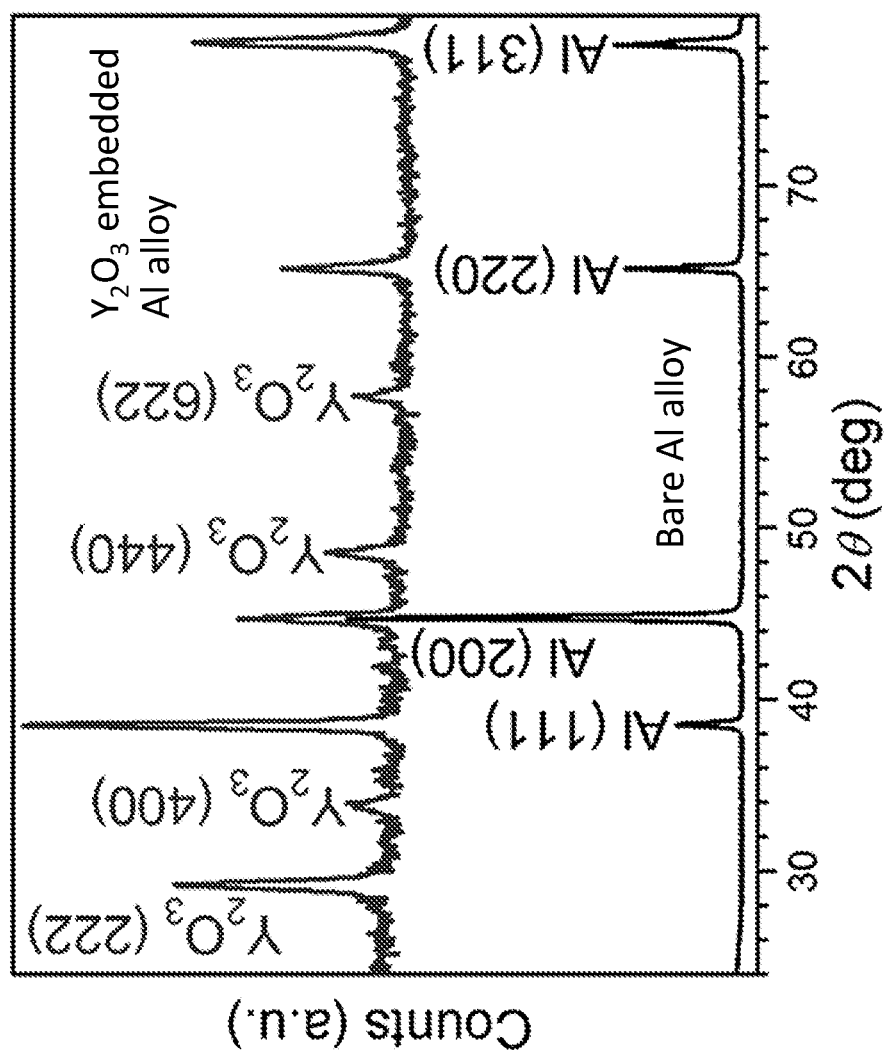

Additional detailed microstructural features of the $Y_2O_3$ nanoparticles-embedded Al surface are revealed by further magnifying the squared areas 1, 2, and 3 of FIG. 5B in FIGS. 5C-5E, respectively. Specifically, squared area 1 is shown in FIG. 5C, squared area 2 is shown in FIG. 5D, and squared area 3 is shown in FIG. 5E. As shown in FIG. 5C, no embedded $Y_2O_3$ nanoparticles were found in the outermost region (i.e., area closest to the surface) of the treated substrate. The nanoparticles carried by the high-speed high-pressure waterjet become embedded in the metallic matrix after traveling for a certain distance and dissipating enough kinetic energy. As a result, a surface-strained layer exists after the metallic matrix absorbs the dissipated kinetic energy. The surface-strained layer is indicated by the small arrows in FIGS. 5B and 5D. FIG. 5D also shows a ~micron thick layer containing embedded $Y_2O_3$ nanoparticles directly below the surface-strained layer. The EDS element analysis conducted for this sample confirmed the presence of $Y_2O_3$ within this layer (results not shown). FIG. 5D also shows that the larger nanoparticles are embedded deeper into the Al substrate than the smaller nanoparticles. As shown in FIG. 5E, directly under this $Y_2O_3$ nanoparticle-rich layer, a grain-refined layer is observed. In this layer, the grain size of the metallic substrate was found to have drastically decreased from larger than several microns to less than 100 nm. The grain-refinement is better shown in FIG. 5F, which shows a magnified version of the squared area 4 of FIG. 5E. FIGS. 5A-5F show that the cavitating waterjet is powerful enough to effectively embed the $Y_2O_3$ nanoparticles into the Al substrate. The treatment provides the Al substrate with a surface-hardened region composed of a surface-strained layer, a $Y_2O_3$ nanoparticle-rich layer directly beneath the surface-strained layer, and a grain-refined layer directly beneath the $Y_2O_3$ nanoparticle-rich layer. This transformation is shown schematically in FIG. 5G.

FIG. 6A shows the grazing-incidence XRD patterns of the Al alloy surfaces before (bottom) and after (top) the $Y_2O_3$ nanoparticle-laden waterjet treatment performed in the transition region. Again, these results indicate successful embedment of the nanoparticles. Both of the characteristic peaks of the face-centered cubic (FCC) Al (JCPDS #04-0787) and cubic $Y_2O_3$ (JCPDS #41-1105) are seen in FIG. 6A after the embedment of the $Y_2O_3$ nanoparticles into the Al substrate.

It is noted that the diffraction intensity of the (200) peak is stronger than that of the (111) peak before the cavitating waterjet treatment (the bottom curve of FIG. 6A). After the treatment, the diffraction intensity of the (200) peak becomes weaker than that of the (111) peak. This change of the relative peak intensity means that crystal grains near the Al surface are reoriented to face a more closely-packed crystalline plane to the substrate surface. A detailed comparison of the (200) peak of the Al substrates with and without embedment of the $Y_2O_3$ nanoparticles is shown in FIG. 6B. A broadening of this characteristic peak is observed after the cavitating waterjet treatment. Reduced grain size and residual stress underneath the treated Al surface (see FIGS. 5C-5F) can contribute the peak broadening. The refined grains may change their packing orders as well, further contributing to the reorientation of the grains as discussed above. FIG. 6B also shows that the characteristic (200) peak has also shifted to the right after the cavitating waterjet treatment, indicating a decreased lattice spacing between the crystalline planes. FIGS. 6A-6B further demonstrate that the embedding process leads to changes of the microstructure of the substrate matrix through a number of mechanisms, including reorientation of grains, reduction of grain sizes, and compressed lattice spacing.

Evaluations of the Hardened Al Surface

Figure 7A:
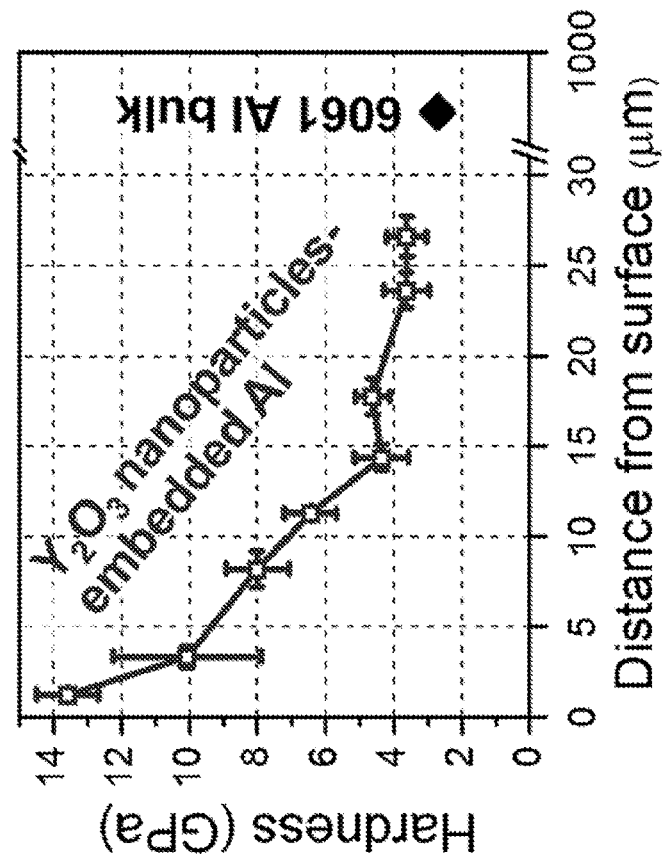
FIG. 7A shows the cross-section profile of nano-indentation hardness after embedment of $Y_2O_3$ nanoparticles into an Al alloy substrate according to an illustrative embodiment.

Nano-indentation profiling across the $Y_2O_3$ nanoparticles-embedded Al substrate was conducted for the well-polished cross-section SEM sample to evaluate its mechanical properties. As shown in FIG. 7A, embedment of the $Y_2O_3$ nanoparticles increases the hardness from about 2.7 GPa in the bulk to about 13.6 GPa at the surface. An increase in surface hardness of more than five times is a very significant improvement. Moreover, FIG. 7A shows that this hardness profile spans an over 20-μm deep hardening zone beneath the surface. Compared with the depth of incorporation of $Y_2O_3$ in the treated Al substrate (about two microns as shown in FIGS. 4 and 5B), this hardening depth suggests that the cavitating-waterjet treatment process induces an extended strain field, resulting in a larger hardened zone.

Figure 7B:
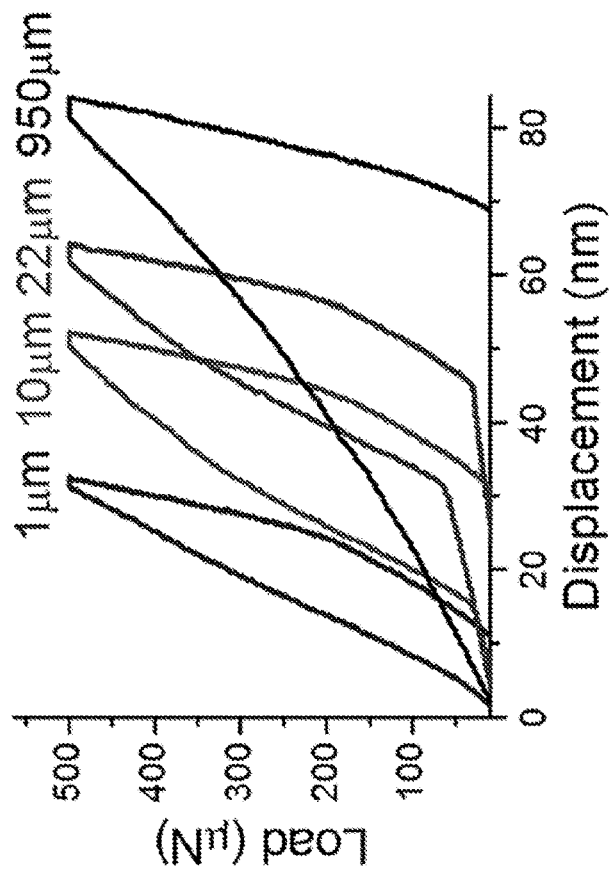
FIG. 7B shows selected nano-indentation load-displacement curves of the $Y_2O_3$ nanoparticles-embedded Al alloy substrate at different distances from the surface.

Representative load-displacement curves of the $Y_2O_3$ nanoparticles-embedded Al substrate at selected distances from its surface are shown in FIG. 7B. The closer the indentation spot to the surface is, the lower the plastic deformation depth after load removal. Shapes of these load-displacement curves are observed to be different. The change of the load versus displacement during the indentation of Al bulk is smooth (not shown) as the metallic matrix has a random and uniform distribution of grains and grain size. However, both the TEM and XRD results (FIGS. 5B-F and FIGS. 6A-6B, respectively) have demonstrated that a series of strengthening layers exist within the $Y_2O_3$ nanoparticles-embedded Al substrate (i.e., the three layers of the surface-hardened region described above). The presence of a surface-hardened region is consistent with the differently shaped load-displacement curves of FIG. 7B. Specifically, the measurement of the indentation contact stiffness experiences different changing rates of the load against displacement while the indenter is penetrating through these different surface layers, resulting in the differently shaped load-displacement curves shown in FIG. 7B.

It is also important to note that the treatment of the same Al alloy substrate by a nanoparticle-free cavitating waterjet under otherwise the same operating conditions does not bring about any detectable change in surface hardness of the Al alloy substrate (results not shown), further confirming that the strengthening effect is produced by the impingement of the nanoparticle-laden waterjet in its transition region.

The nano-indentation profiling data indicates that the extent of the resulting hardened zone/depth is comparable to or better than that achieved by traditional case-hardening processes, but which are obtainable only at elevated temperatures.

Without wishing to be bound to any particular theory, the microstructural and composition characterizations discussed above with respect to FIGS. 4A-4E through 6A-6B account for the strengthening of the Al alloy substrate surface as follows. First, within the treated Al substrate (~2 microns from the surface), the strengthening agents (i.e., $Y_2O_3$ nanoparticles) are uniformly and densely embedded within the metallic matrix. These particles serve as barriers to dislocation motion—the primary strengthening mechanism responsible for the remarkable increase in surface hardness. Second, the Al matrix grains can rearrange to vertically align their most close-packed lattice planes with the loading direction, inducing a texture strengthening process. Third, a surface-strained layer is observed directly below the treated Al surface after embedding the nanoparticles. The nano-indentation tests shown in FIG. 7B also indicate the presence of this surface-strained layer, which is additionally beneficial in resisting plastic deformation or failure upon indentation. Fourth, the high-pressure-high-speed nanoparticle-laden waterjet can refine the Al crystal grains within the surface during processing. By significantly decreasing crystallite size, dislocation propagation/movement is greatly impeded by the significantly increased amount of grain boundaries, thereby leading to a hindrance to the onset of the plastic deformation (Hall-Petch strengthening).

Figure 8B:
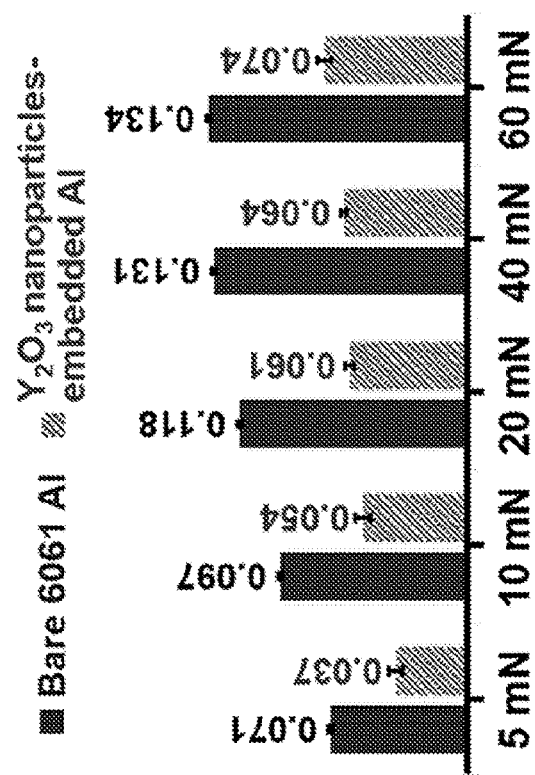
FIG. 8B compares the average coefficients of friction extracted from the data of FIG. 8A.
Figure 8A:
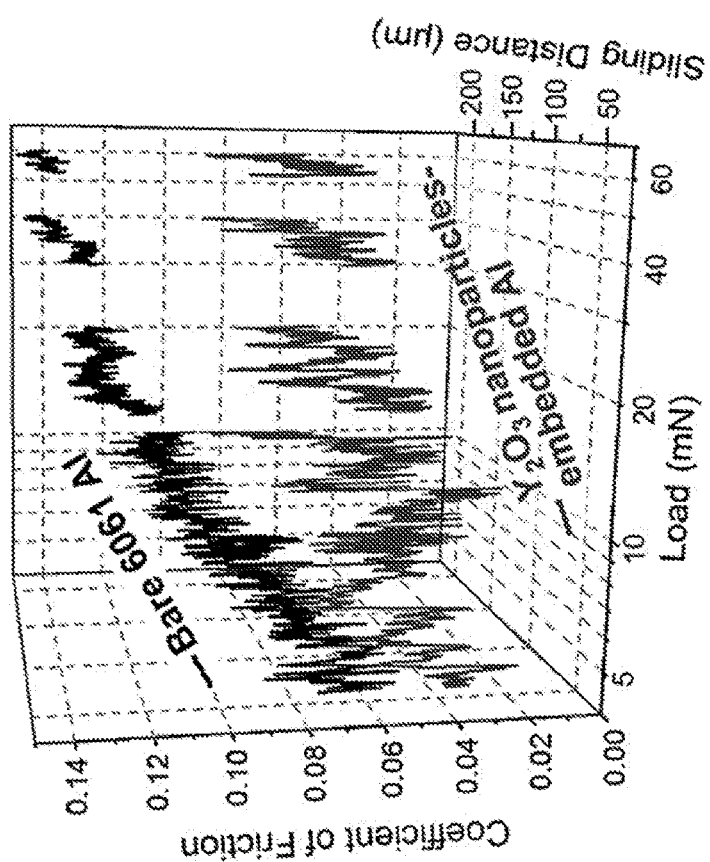
FIG. 8A shows the microscale scratching test results of the Al alloy surfaces before (top) and after (bottom) the embedment of $Y_2O_3$ nanoparticles according to an illustrative embodiment; the tests were conducted under different loads.

The high-efficiency and room-temperature processing technique described in this Example also provides treated substrates with desirable tribological properties. As shown in FIGS. 8A and 8B, no matter how the external load or the sliding distance changes, microscale scratching test results demonstrate consistently low coefficients of friction for the $Y_2O_3$ nanoparticles-embedded Al alloy. The results show that embedding the $Y_2O_3$ nanoparticles into the Al alloy reduces the dry-sliding friction by about 50%. The greatly reduced coefficients of friction mainly result from the significantly increased hardness. The behavior of the $Y_2O_3$ nanoparticle embedded Al alloy is similar to behaviors that are generally found in the moderate-pressure sliding of a ductile metallic pin over hard substrates, such as carbides [47-50], nitrides [50-52], borides [53-56], and diamonds or diamond-like carbons [57-60]. It is also noted that friction/adhesion during a dry sliding process is proportional to the mutual solubility/compatibility of the materials involved in moving contacts [61-63]. The microscale scratching tests were conducted by sliding a steel tip over the different Al substrates. The relatively high-friction process observed on the bare Al surface could be caused, at least partially, by the strong adhesion of the mutually soluble Al—Fe pairs [62]. By contrast, for the $Y_2O_3$ nanoparticles-embedded Al surface, the insoluble metal pair (i.e., Y—Fe) and/or the non-metal-metal (i.e., $Y_2O_3$ vs. steel) pair is further decreases the sliding friction by passivating the adhesive areas of the contacting asperities.

CONCLUSIONS

The present Example has demonstrated the use of a cavitating waterjet to embed oxide nanoparticles into a metallic substrate to achieve a desirable surface hardening process. Unlike conventional case-hardening methods, this new processing technique can be performed at room temperature and with high efficiency. Without the need to treat surfaces at elevated temperatures, the novel method overcomes the problems and troubles commonly encountered by the traditional surface processing technologies.

REFERENCES

[1] I. Safi, Recent aspects concerning DC reactive magnetron sputtering of thin films: a review, Surf. Coat. Technol. 127 (2000) 203-218.

[2] I. Petrov, P. B. Barna, L. Hultman, J. E. Greene, Microstructural evolution during film growth, J. Vac. Sci. Technol. A 21 (2003) S117-S128.

[3] K. Sarakinos, J. Alami, S. Konstantinidis, High power pulsed magnetron sputtering: A review on scientific and engineering state of the art, Surf. Coat. Technol. 204 (2010) 1661-1684.

[4] U. Helmersson, M. Lattemann, J. Bohlmark, A. P. Ehiasarian, J. T. Gudmundsson, Ionized physical vapor deposition (IPVD): A review of technology and applications, Thin Solid Films 513 (2006) 1-24.

[5] A. Anders, Deposition rates of high power impulse magnetron sputtering: Physics and economics, J. Vac. Sci. Technol. A 28 (2010) 783-790.

[6] S. Kuroda, J. Kawakita, M. Watanabe, H. Katanoda, Warm spraying—a novel coating process based on high-velocity impact of solid particles, Sci Technol Adv Mater. 9 (2008) 033002.

[7] B. Yang, F. Wang, J. S. Zhang, Microstructural characterization of in situ TiC/Al and TiC/Al-20Si-5Fe-3Cu-1Mg composites prepared by spray deposition, Acta Mater. 51 (2003) 4977-4989.

[8] J. Lee, J. Y. Jung, E. -S. Lee, W. J. Park, S. Ahn, N. J. Kim, Microstructure and properties of titanium boride dispersed Cu alloys fabricated by spray forming, Mater. Sci. Eng. A 277 (2000) 274-283.

[9] S. Kuroda, M. Watanabe, K. Kim, H. Katanoda, Current status and future prospects of warm spray technology, J. Therm. Spray Technol. 20 (2011) 653-676.

[10] A. Moridi, S. M. Hassani-Gangaraj, M. Guagliano, M. Dao, Cold spray coating: review of material systems and future perspectives, Surface Eng. 30 (2014) 369-395.

[11] R. S. Mishra, Z. Y. Ma, Friction stir welding and processing, Mater. Sci. Eng. R-Rep. 50 (2005) 1-78.

[12] R. S. Mishra, Z. Y. Ma, I. Chant, Friction stir processing: a novel technique for fabrication of surface composite, Mater. Sci. Eng. A 341 (2003) 307-310.

[13] K. L. Choy, Chemical vapour deposition of coatings, Prog. Mater. Sci. 48 (2003) 57-170.

[14] L. G. Yu, X. J. Chen, K. A. Khor, G. Sundararajan, FeB/Fe2B phase transformation during SPS pack-boriding: Boride layer growth kinetics, Acta Mater. 53 (2005) 2361-2368.

[15] G. Kartal, S. Timur, M. Urgen, A. Erdemir, Electrochemical bonding of titanium for improved mechanical properties, Surf. Coat. Technol. 204 (2010) 3935-3939.

[16] X. He, H. Xiao, K. Balzuweit, M. Ozaydin, H. Liang, Low-temperature bonding of high-carbon steel, Surf. Coat. Technol. 263 (2015) 21-26.

[17] W. P. Tong, N. R. Tao, Z. B. Wang, J. Lu, K. Lu, Nitriding iron at lower temperatures, Science 299 (2003) 686-688.

[18] E. J. Mittemeijer, M. A. J. Somers, Thermodynamics, kinetics, and process control of nitriding, Surface Eng. 13 (1997) 483-497.

[19] P. Schaaf, Laser nitriding of metals, Prog. Mater. Sci. 47 (2002) 1-161.

[20] A. Zhecheva, W. Sha, S. Malinov, A. Long, Enhancing the microstructure and properties of titanium alloys through nitriding and other surface engineering methods, Surf. Coat. Technol. 200 (2005) 2192-2207.

[21] M. Tsujikawa, D. Yoshida, N. Yamauchi, N. Ueda, T. Sone, S. Tanakad, Surface material design of 316 stainless steel by combination of low temperature carburizing and nitriding, Surf. Coat. Technol. 200 (2005) 507-511.

[22] P. Kula, R. Pietrasik, K. Dybowski, Vacuum carburizing—process optimization, J. Mater. Process. Technol. 164 (2005) 876-881.

[23] K. Tokaji, K. Kohyama, M. Akita, Fatigue behaviour and fracture mechanism of a 316 stainless steel hardened by carburizing, Int. J. Fatigue 26 (2004) 543-551.

[24] A. Azhari, C. Schindler, B. Li, Effect of waterjet peening on aluminum alloy 5005, Int. J. Adv. Manuf. Technol. 67 (2013) 785-795.

[25] M. Ramulu, S. Kunaporn, M. Jenkins, M. Hashish, J. Hopkins, Fatigue performance of high-pressure waterjet-peened aluminum alloy, J. Pressure Vessel Technol. 124 (2001) 118-123.

[26] A. Azhari, C. Schindler, E. Kerscher, P. Grad, Improving surface hardness of austenitic stainless steel using waterjet peening process, Int. J. Adv. Manuf Tech. 63 (2012) 1035-1046.

[27] A. S. Grinspan, R. Gnanamoorthy, Surface modification by oil jet peening in Al alloys, AA6063-T6 and AA6061-T4: Residual stress and hardness, Appl. Surf. Sci. 253 (2006) 989-996.

[28] M. Ramulu, S. Kunaporn, D. Arola, M. Hashish, J. Hopkins, Waterjet machining and peening of metals, J. Pressure Vessel Technol. 122 (1999) 90-95.

[29] M. K. Kulekci, Processes and apparatus developments in industrial waterjet applications, Int. J. Mach. Tool. Manu. 42 (2002) 1297-1306.

[30] J. Folkes, Waterjet—An innovative tool for manufacturing, J. Mater. Process. Technol. 209 (2009) 6181-6189.

[31] M. Shukla, Abrasive Water Jet Milling, in: J. P. Davim (Ed.), Nontraditional Machining Processes, Springer, London, 2013, pp. 177-203.

[32] A. Azhari, S. Sulaiman, A. K. P. Rao, A review on the application of peening processes for surface treatment, TOP Conf. Ser.: Mater. Sci. Eng. 114 (2016) 012002.

[33] M. Hashish, WaterJet Machining Process, in: A. Y. C. Nee (Ed.), Handbook of Manufacturing Engineering and Technology, Springer, London, 2015, pp. 1651-1686.

[34] A. Chillman, M. Ramulu, M. Hashish, Waterjet and water-air jet surface processing of a titanium alloy: a parametric evaluation, J. Manuf. Sci. Eng. 132 (2010) 011012.

[35] H. Syazwani, G. Mebrahitom, A. Azmir, A review on nozzle wear in abrasive water jet machining application, IOP Conf. Ser.: Mater. Sci. Eng. 114 (2016) 012020.

[36] A. Chillman, M. Hashish, M. Ramulu, Energy based modeling of ultra high-pressure waterjet surface preparation processes, J. Pressure Vessel Technol. 133 (2011) 061205.

[37] M. S. Plesset, A. Prosperetti, Bubble dynamics and cavitation, Annu. Rev. Fluid Mech. 9 (1977) 145-185.

[38] C. E. Brennen, Cavitation and Bubble Dynamics, Oxford University Press 1995.

[39] K. S. Suslick, D. J. Flannigan, Inside a collapsing bubble: sonoluminescence and the conditions during cavitation, Annu. Rev. Phys. Chem. 59 (2008) 659-683.

[40] R. Pecha, B. Gompf, Microimplosions: cavitation collapse and shock wave emission on a nanosecond time scale, Phys. Rev. Lett. 84 (2000) 1328.

[41] S. Merouani, O. Hamdaoui, Y. Rezgui, M. Guemini, Theoretical estimation of the temperature and pressure within collapsing acoustical bubbles, Utrason. Sonochem. 21 (2014) 53-59.

[42] M. Song, C. Sun, J. Jang, C. H. Han, T. K. Kim, K. T. Hartwig, X. Zhang, Microstructure refinement and strengthening mechanisms of a 12Cr ODS steel processed by equal channel angular extrusion, J. Alloys Compd. 577 (2013) 247-256.

[43] M. Dadea, J. Malaplate, J. Garnier, F. D. Geuser, F. Barcelo, P. Wident, A. Deschamps, Influence of microstructural parameters on the mechanical properties of oxide dispersion strengthened Fe-14Cr steels, Acta Mater. 127 (2017) 165-177.

[44] J. Heigel, J. S. Andrawes, J. T. Roth, M. E. Hogue, R. M. Ford, Viability of electrically treating 6061 T6511 aluminum for use in manufacturing processes, Trans. North Am. Manuf. Res. Ins. SME 33 (2005) 145-152.

[45] S. Lim, S. Kim, C. -G. Lee, S. Kim, Tensile behavior of friction-stri-welded Al 6061-T651, Metall. Mater. Trans. A 35 (2004) 2829-2835.

[46] F. C. Liu, Z. Y. Ma, Influence of tool dimension and welding parameters on microstructure and mechanical properties of friction-stir-welded 6061-T651 aluminum alloy, Metall. Mater. Trans. A 39 (2008) 2378-2388.

[47] D. Nilsson, F. Svahn, U. Wiklund, S. Hogmark, Low-friction carbon-rich carbide coatings deposited by co-sputtering, Wear 254 (2003) 1084-1091.

[48] J. Pirso, S. Letunovitg, M. Viljus, Friction and wear behaviour of cemented carbides, Wear 257 (2004) 257-265.

[49] K. Bonny, P. D. Baets, Y. Perez, J. Vleugels, B. Lauwers, Friction and wear characteristics of WC-Co cemented carbides in dry reciprocating sliding contact, Wear 268 (2010) 1504-1517.

[50] M. Tkadletz, N. Schalk, R. Daniel, J. Keckes, C. Czettl, ChristianMitterer, Advanced characterization methods for wear resistant hard coatings: A review on recent progress, Surf. Coat. Technol. 285 (2016) 31-46.

[51] A. Liu, J. Deng, H. Cui, Y. Chen, J. Zhao, Friction and wear properties of TiN, TiAlN, AlTiN and CrAlN PVD nitride coatings, Int. J. Refract. Met. Hard Mater. 31 (2012) 82-88.

[52] E. Santecchia, A. M. S. Hamouda, F. Musharavati, E. Zalnezhad, M. Cabibbo, S. Spigarelli, Wear resistance investigation of titanium nitride-based coatings, Ceram. Int. 41 (2015) 10349-10379.

[53] R. G. Munro, Material properties of titanium diboride, J. Res. Natl. Inst. Stand. Technol. 105 (2000) 709-720.

[54] B. Selcuk, R. Ipek, M. B. Karamiş. A study on friction and wear behaviour of carburized, carbonitrided and borided AISI 1020 and 5115 steels, J. Mater. Process. Technol. 141 (2003) 189-196.

[55] K. Krishnaveni, T. S. N. S. Narayanan, S. K. Seshadri, Electroless Ni-B coatings: preparation and evaluation of hardness and wear resistance, Surf. Coat. Technol. 190 (2005) 115-121.

[56] S. Taktak, Tribological behaviour of borided bearing steels at elevated temperatures, Surf. Coat. Technol. 201 (2006) 2230-2239.

[57] D. M. Gruen, Nanocrystalline diamond films, Annu. Rev. Mater. Sci. 29 (1999) 211-259.

[58] K. Miyoshi, R. L. C. Wu, A. Garscadden, Friction and wear of diamond and diamondlike carbon coatings, Surf. Coat. Technol. 54-55 (1992) 428-434.

[59] A. Grill, Diamond-like carbon: state of the art, Diam. Relat. Mater. 8 (1999) 428-434.

[60] A. Erdemir, C. Donnet, Tribology of diamond-like carbon films: recent progress and future prospects, J. Phys. D Appl. Phys. 39 (2006) R311-R327.
[61] E. Rabinowicz, The determination of the compatibility of metals through static friction tests, ASLE Trans. 14 (1971) 198-205.
[62] T. W. Scharf, S. V. Prasad, Solid lubricants: a review, J. Mater. Sci. 48 (2013) 511-531.
[63] H. A. Murdoch, C. A. Schuh, Estimation of grain boundary segregation enthalpy and its role in stable nanocrystalline alloy design, J. Mater. Res. 28 (2013) 2154-2163.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the present disclosure has been presented for purposes of illustration and of description. It is not intended to be exhaustive or to limit the present disclosure to the precise form disclosed, and modifications and variations are possible in light of the above teachings or may be acquired from practice of the present disclosure. The embodiments were chosen and described in order to explain the principles of the present disclosure and as practical applications of the present disclosure to enable one skilled in the art to utilize the present disclosure in various embodiments and with various modifications as suited to the particular use contemplated. It is intended that the scope of the present disclosure be defined by the claims appended hereto and their equivalents.

What is claimed is:

1. A method of hardening a surface of a substrate, the method comprising directing a waterjet having a transition flow region, the waterjet comprising water and particles, at a surface of a substrate such that the waterjet impacts the surface within the transition flow region to provide a sub-surface layer of embedded particles underneath the surface of the substrate, thereby forming a hardened substrate.

2. The method of claim 1, wherein the particles are nanoparticles, microparticles, or combinations thereof.

3. The method of claim 1, wherein the particles are composed of a metal, a metal alloy, a metal oxide, a metal boride, a metal nitride, a metal carbide, a metal phosphide, a metal sulfide, a metal arsenide, a metal selenide, or combinations of such particles.

4. The method of claim 1, wherein the surface of the substrate is composed of a metal or a metal alloy.

5. The method of claim 1, wherein the substrate is composed of a metal or a metal alloy and the particles are transition metal oxide nanoparticles.

6. The method of claim 5, wherein the substrate is an aluminum alloy and the particles are $Y_2O_3$ nanoparticles.

7. The method of claim 1, wherein the method is carried out at a temperature equal to or less than 100° C.

8. The method of claim 1, wherein the hardened substrate is characterized by a depth of incorporation of the embedded particles and a hardening depth, wherein the hardening depth is at least about 5 times greater than the depth of incorporation.

9. The method of claim 1, wherein the hardened substrate is characterized by a surface hardness which is at least about 5 times greater than a surface hardness of the substrate as measured prior to hardening.

10. The method of claim 9, wherein the hardened substrate is characterized by a surface roughness $R_a$ value that is no more than about 2 times greater than that of the substrate as measured prior to hardening.

11. The method of claim 1, wherein the hardened substrate further comprises a surface-strained layer extending from the surface of the substrate and over the sub-surface layer of embedded particles, wherein the sub-surface layer of embedded particles has a greater density of the particles than the surface-strained layer.

12. The method of claim 11, further comprising a grain-refined layer under the sub-surface layer of embedded particles and an extended strained layer under the grain-refined layer.

13. A hardened substrate having a surface and comprising a sub-surface layer of embedded particles underneath the surface of the substrate.

14. The hardened substrate of claim 13, wherein the substrate is composed of a metal or a metal alloy and the particles are composed of a transition metal oxide.

15. The hardened substrate of claim 14, wherein the particles are nanoparticles.

16. The hardened substrate of claim 14, wherein the substrate is an aluminum alloy and the particles are $Y_2O_3$ nanoparticles.

17. The hardened substrate of claim 13, wherein the hardened substrate is characterized by a surface hardness which is at least about 5 times greater than a surface hardness of the substrate absent the sub-surface layer of embedded particles.

18. The hardened substrate of claim 13, wherein the hardened substrate is characterized by a surface roughness $R_a$ value that is no more than about 2 times greater than that of the substrate absent the sub-surface layer of embedded particles.

19. The hardened substrate of claim 13, further comprising a surface-strained layer extending from the surface of the substrate and over the sub-surface layer of embedded particles, wherein the sub-surface layer of embedded particles has a greater density of the particles than the surface-strained layer.

20. The hardened substrate of claim 19, further comprising a grain-refined layer under the sub-surface layer of embedded particles and an extended strained layer under the grain-refined layer.

* * * * *